US012638744B2

(12) United States Patent
Johnson et al.

(10) Patent No.: US 12,638,744 B2
(45) Date of Patent: May 26, 2026

(54) METHODS AND APPARATUS TO GENERATE TERAHERTZ WAVES THROUGH CASCADED NONLINEAR PROCESSES

(71) Applicant: Massachusetts Institute of Technology, Cambridge, MA (US)

(72) Inventors: Steven G. Johnson, Arlington, MA (US); Marin Soljacic, Belmont, MA (US); Charles Roques-Carmes, Cambridge, MA (US); Yannick Salamin, Arlington, MA (US); Zin Lin, Boston, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 256 days.

(21) Appl. No.: 18/288,324

(22) PCT Filed: Apr. 25, 2022

(86) PCT No.: PCT/US2022/026129
§ 371 (c)(1),
(2) Date: Oct. 25, 2023

(87) PCT Pub. No.: WO2022/240577
PCT Pub. Date: Nov. 17, 2022

(65) Prior Publication Data
US 2024/0385495 A1 Nov. 21, 2024

Related U.S. Application Data

(60) Provisional application No. 63/182,177, filed on Apr. 30, 2021, provisional application No. 63/179,726, filed on Apr. 26, 2021.

(51) Int. Cl.
*G02F 1/35* (2006.01)

(52) U.S. Cl.
CPC .......... *G02F 1/3503* (2021.01); *G02F 1/3507* (2021.01); *G02F 1/3534* (2013.01);
(Continued)

(58) Field of Classification Search
CPC .... G02F 1/3503; G02F 1/3507; G02F 1/3542; G02F 1/3534
See application file for complete search history.

(56) References Cited

U.S. PATENT DOCUMENTS 10,082,627 B2 * 9/2018 Park ........................ G02B 6/264
10,234,745 B2 * 3/2019 Moffitt .................. G02F 1/3556
(Continued)

FOREIGN PATENT DOCUMENTS

WO 2020/120293 A1 6/2020

OTHER PUBLICATIONS

International Search Report and Written Opinion mailed Feb. 2, 2023 in corresponding PCT application No. PCT/US2022/026129.

*Primary Examiner* — Tina Wong
(74) *Attorney, Agent, or Firm* — Nields, Lemook + Frame, LLC.

(57) ABSTRACT

A system and method that may enable the generation of highly-efficient, high-power, narrow-linewidth, and tunable light sources from microwave frequencies to mid-infrared wavelengths is disclosed. The light source comprises a nonlinear medium coupled to a multi-modal cavity and a high-energy pump source. The nonlinear medium provides three-wave mixing between modes present in the cavity to generate, for example, terahertz waves. The broadband cavity enables cascading nonlinear processes. By engineering the Q-factors of the cavity's many modes, red-shifted (stokes) cascaded nonlinear processes strongly dominate (Continued)

over their blue-shifted (anti-stokes) counterparts, resulting in a quasi-complete depletion of the pump energy into the THz mode.

38 Claims, 18 Drawing Sheets

(52) U.S. Cl.
CPC ........ *G02F 1/3542* (2021.01); *G02F 2202/20* (2013.01); *G02F 2203/13* (2013.01)

(56) References Cited

U.S. PATENT DOCUMENTS

| | | |
|---|---|---|
| 2005/0163187 A1 | 7/2005 | Spinelli et al. |
| 2007/0102694 A1 | 5/2007 | Drndic et al. |
| 2009/0232462 A1* | 9/2009 | Creeden ................ G02F 1/3534 |
| | | 385/122 |
| 2014/0191131 A1* | 7/2014 | Uchida ................. G02F 1/3544 |
| | | 250/341.1 |
| 2015/0338719 A1 | 11/2015 | Meundel et al. |
| 2020/0014166 A1* | 1/2020 | Lee ........................... H01S 1/02 |
| 2020/0166822 A1 | 5/2020 | Nawata et al. |
| 2021/0305768 A1 | 9/2021 | Budnicki |

* cited by examiner

FIG. 2A
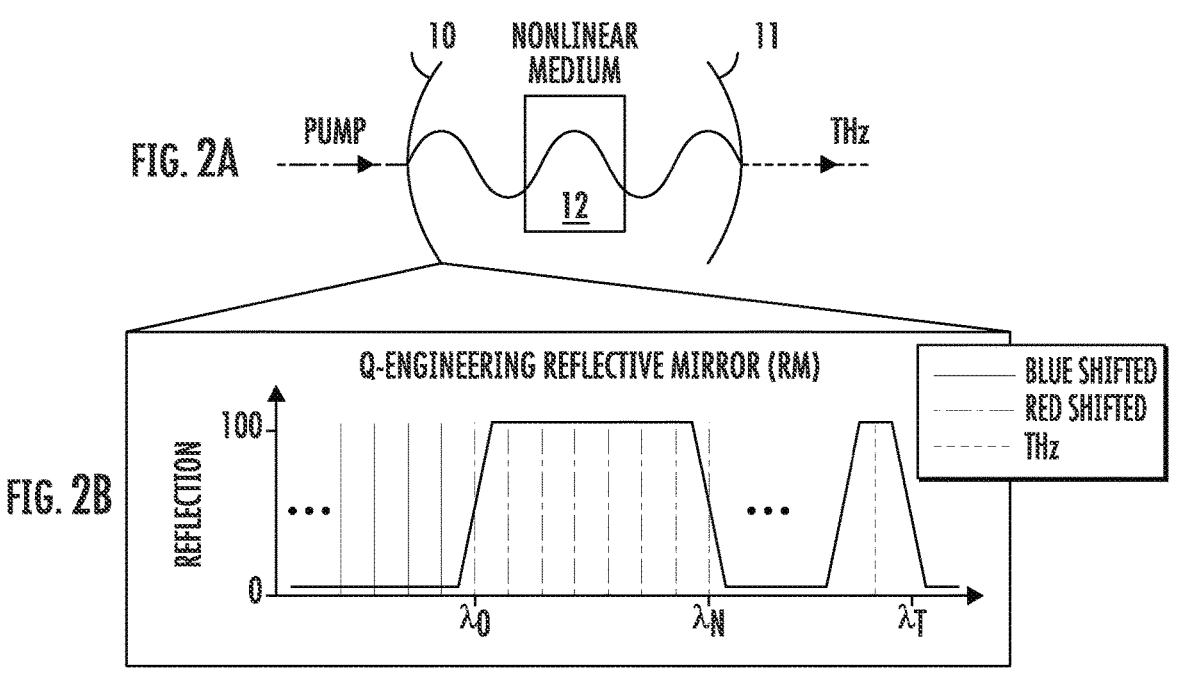
FIG. 2B
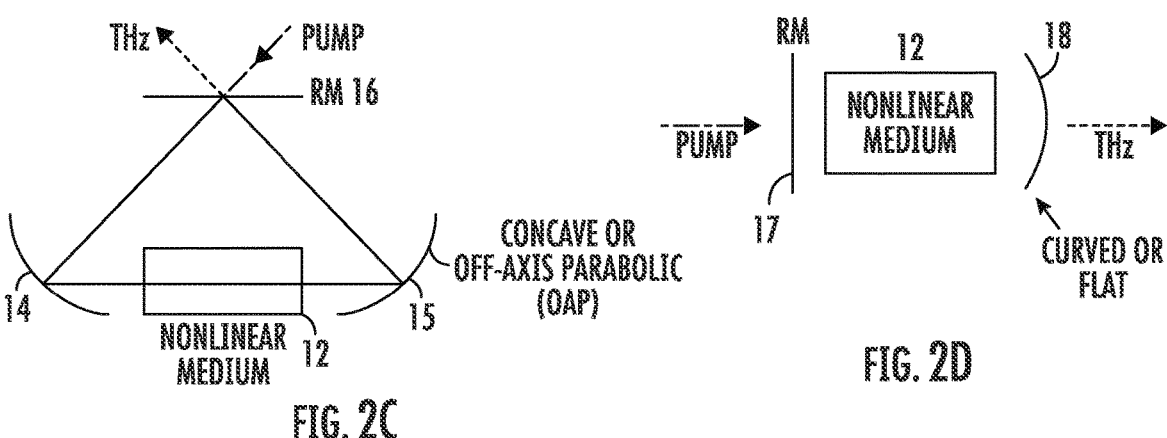
FIG. 2C
FIG. 2D
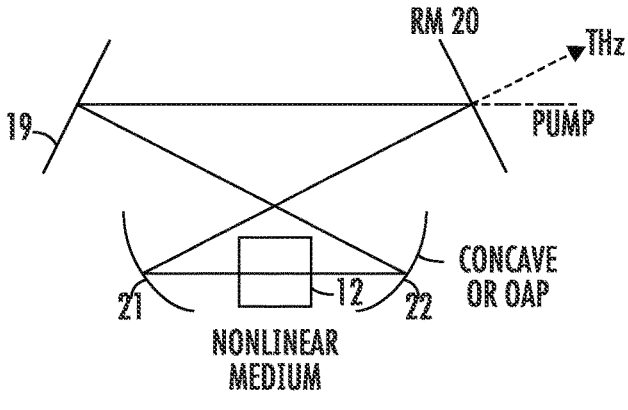
FIG. 2E

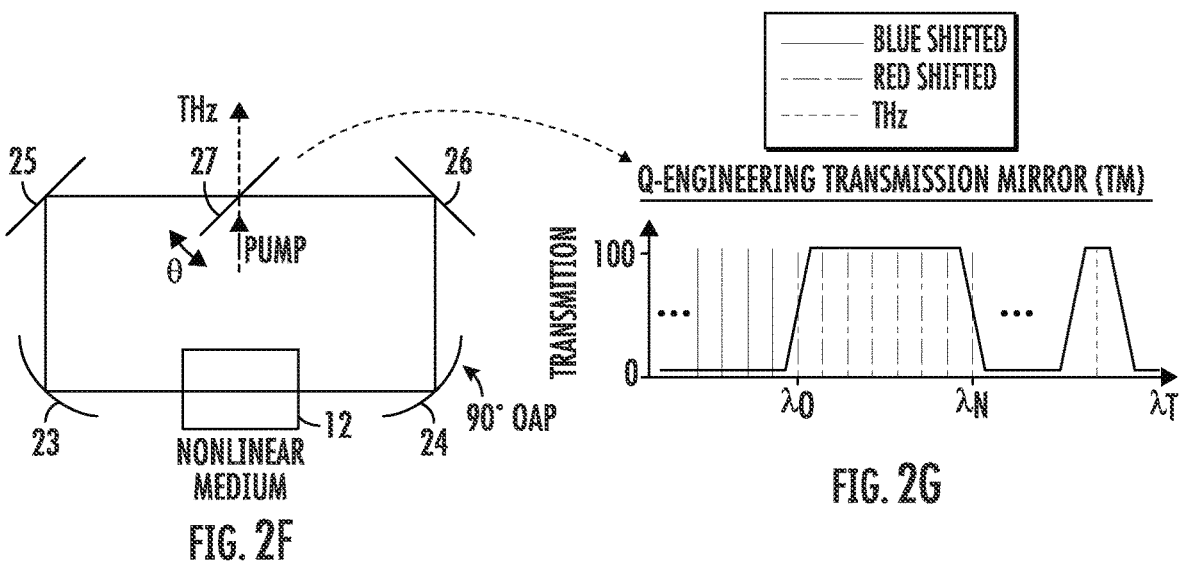
FIG. 2F
FIG. 2G
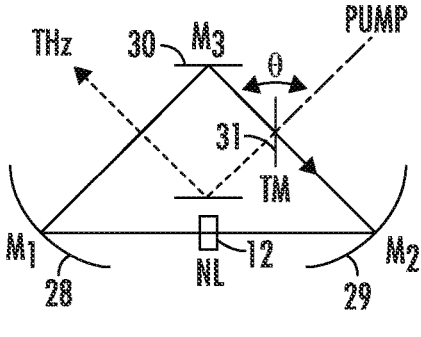
FIG. 2H
FIG. 2I
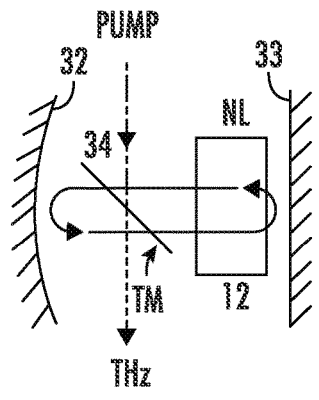
FIG. 2J
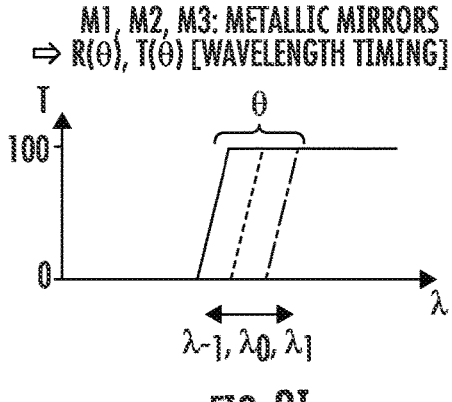
FIG. 2K INTEGRATED THz SOURCE:

THE CHAIN IS BROKEN
FOR BLUE-SHIFTED PROCESS

COUPLING IR AND THz CAVITIES:

CROSS-SECTION:

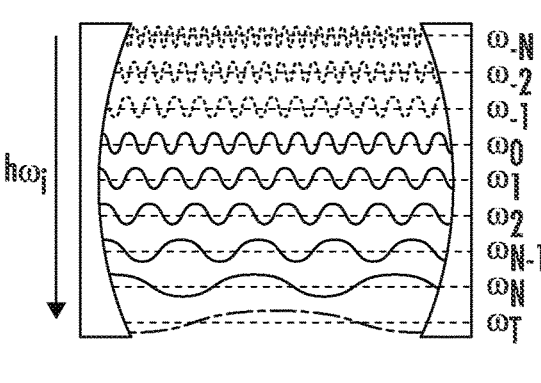
FIG. 4A
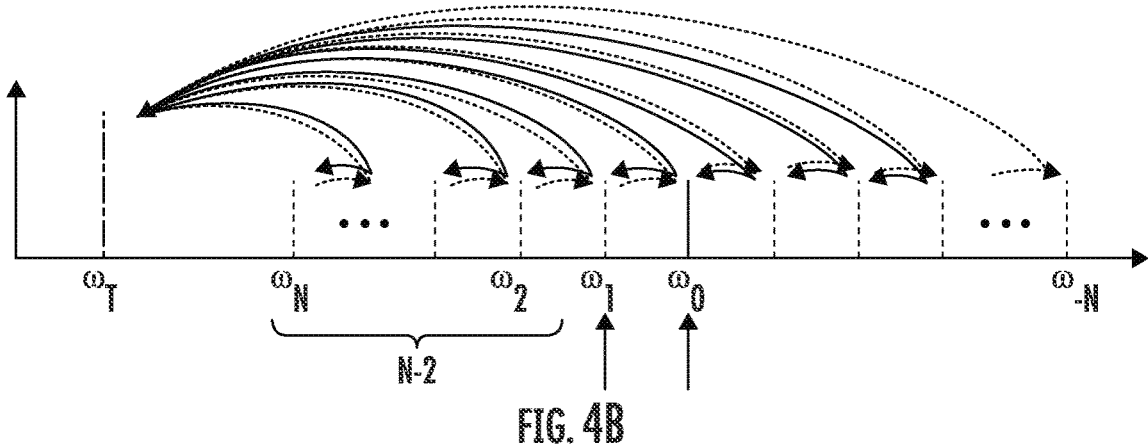
FIG. 4B
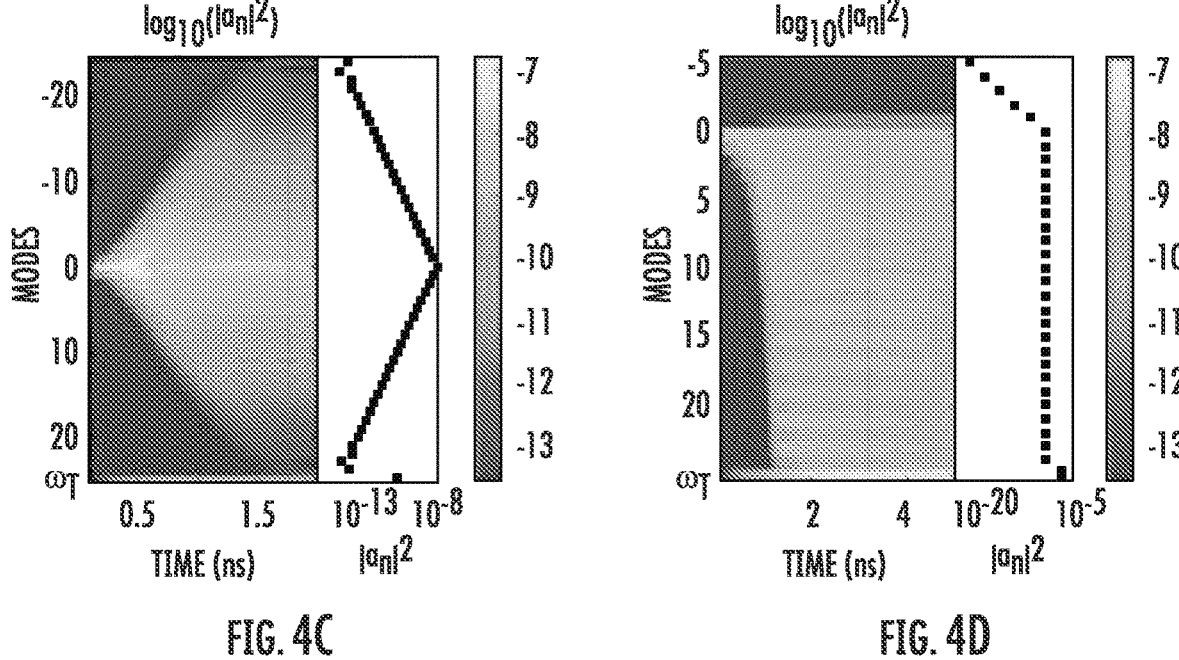
FIG. 4C FIG. 4D

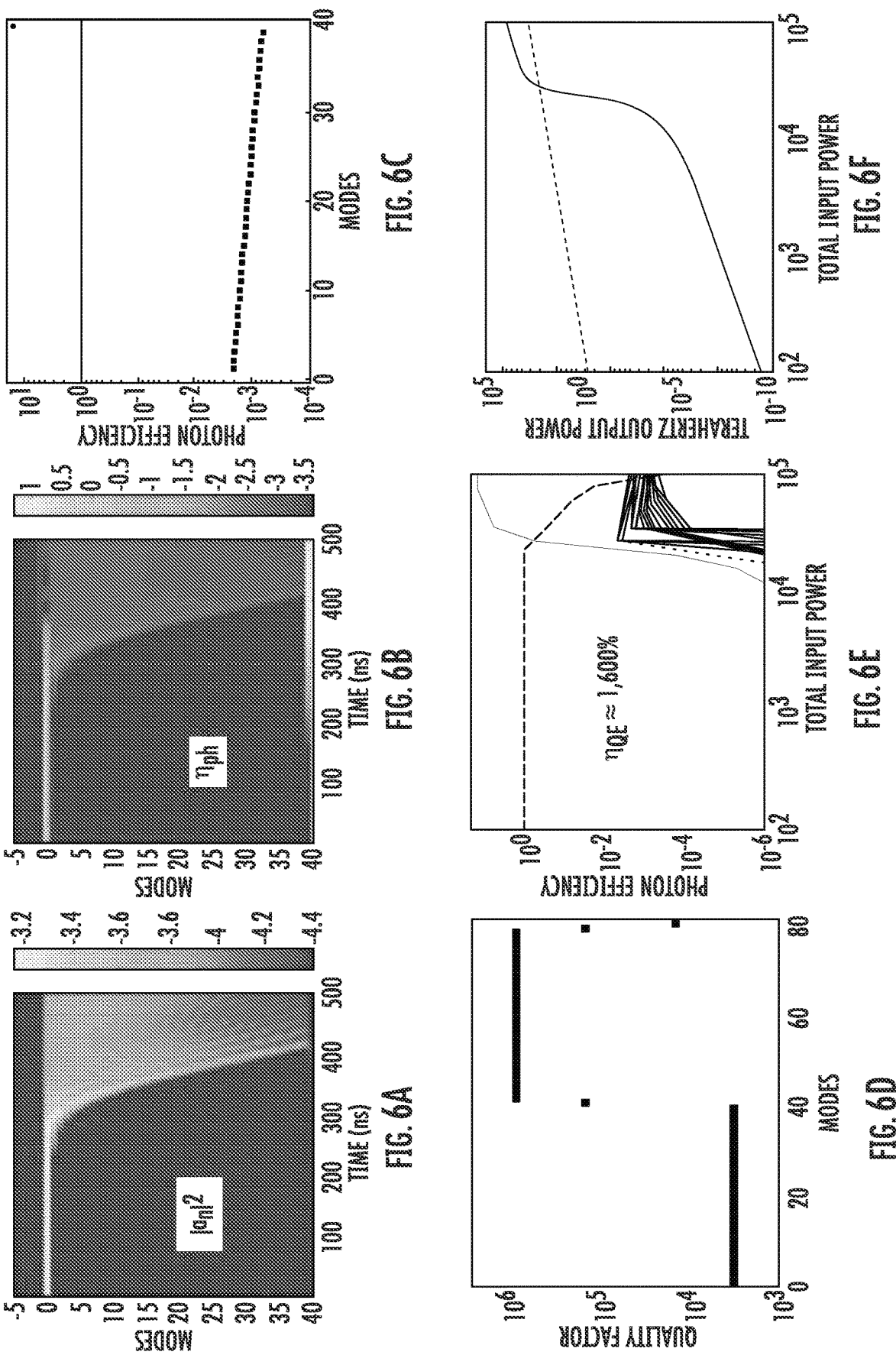

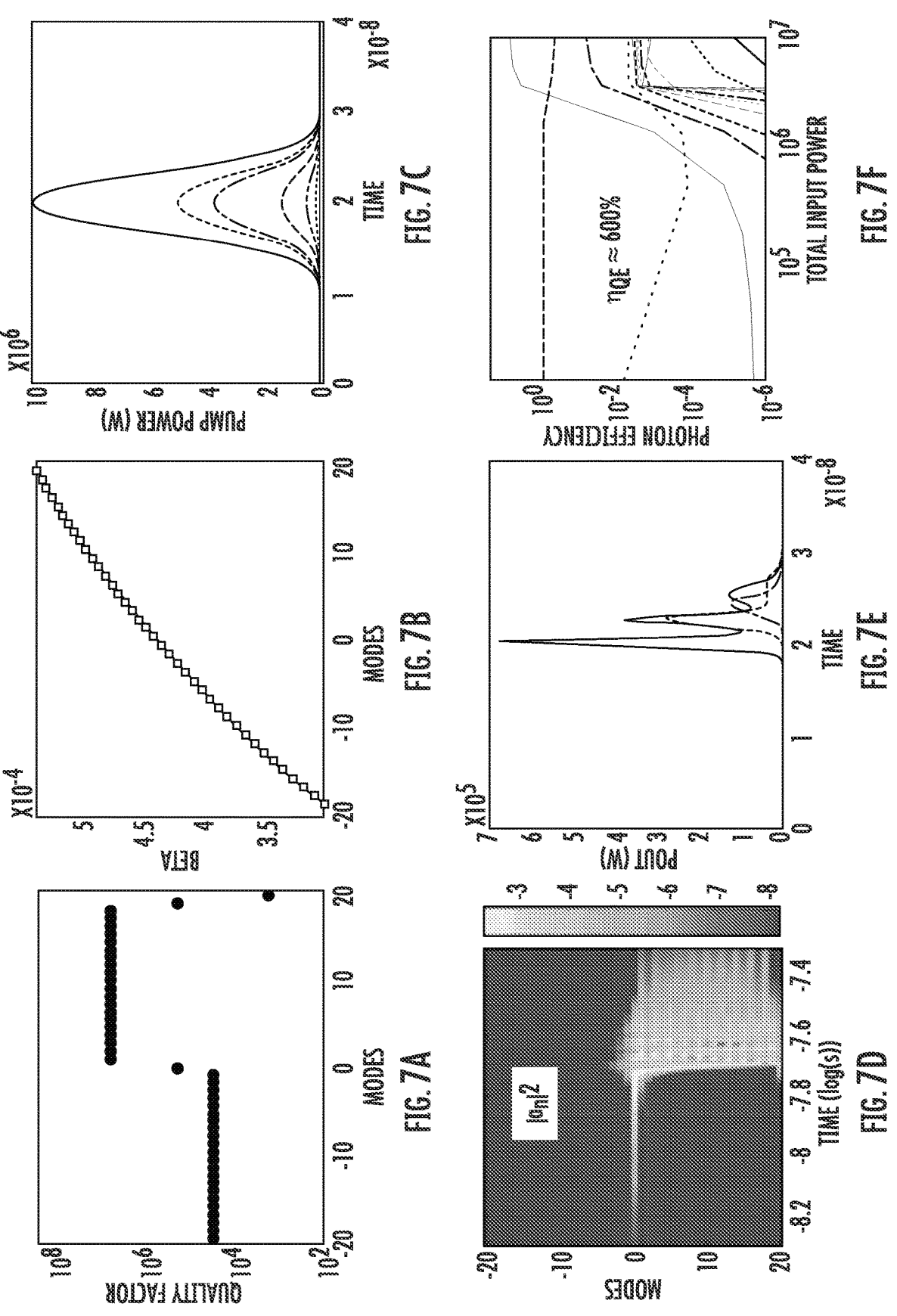

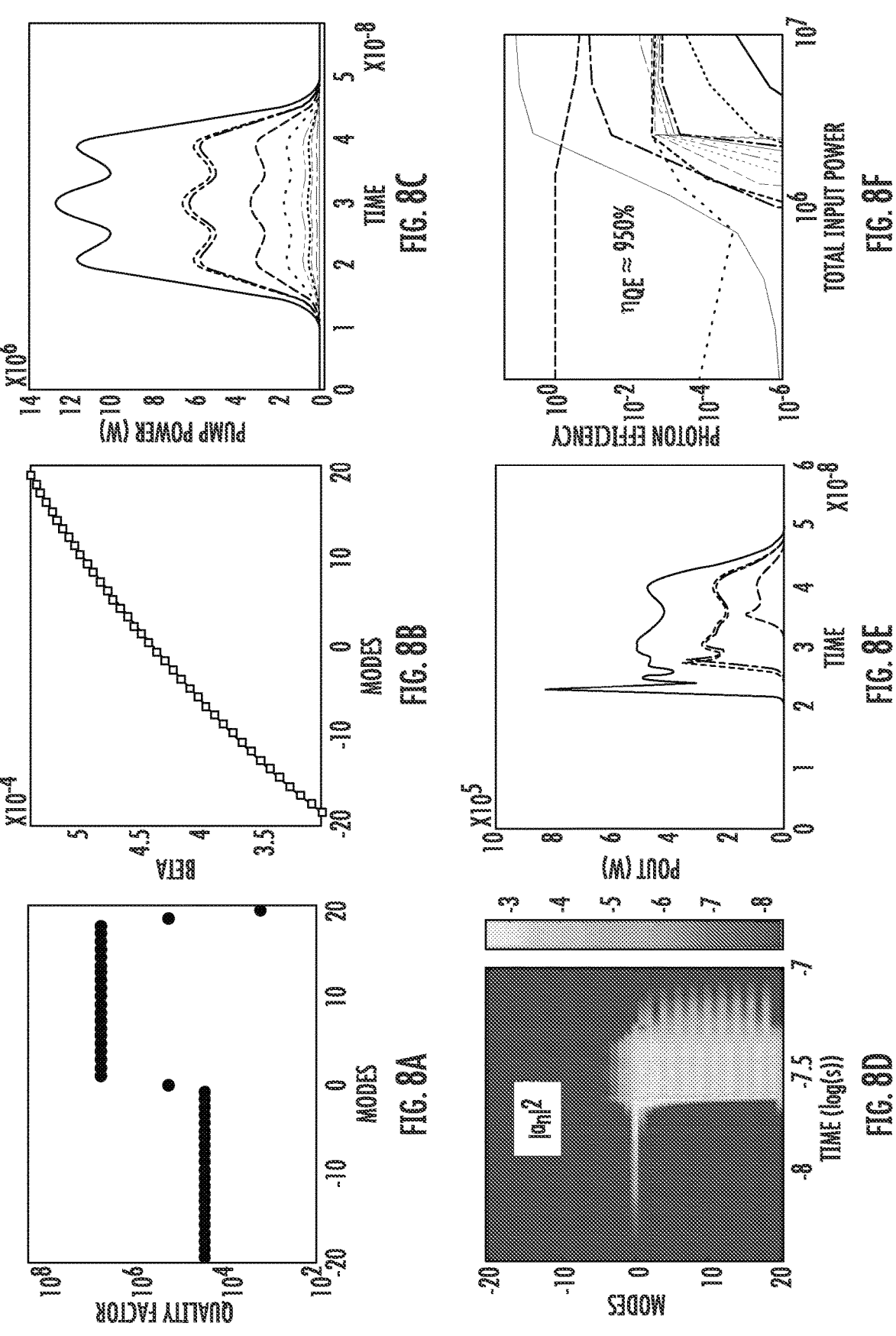

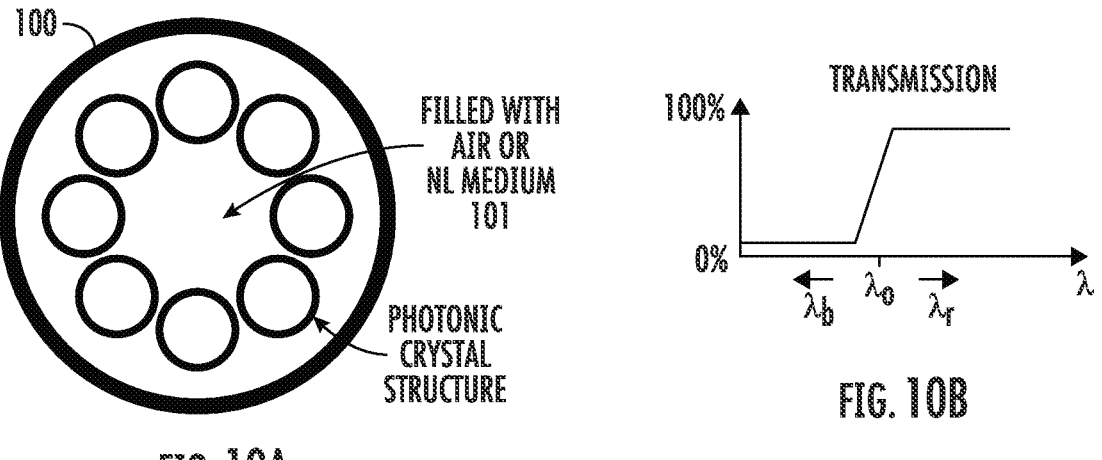
FIG. 10A
FIG. 10B
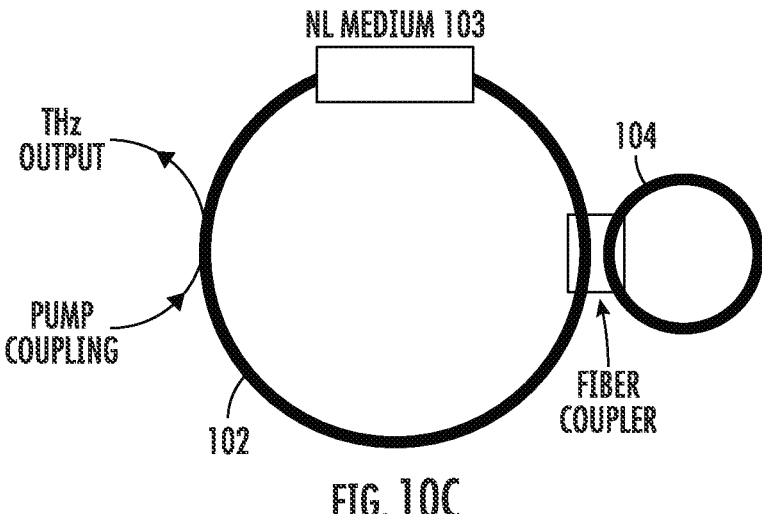
FIG. 10C
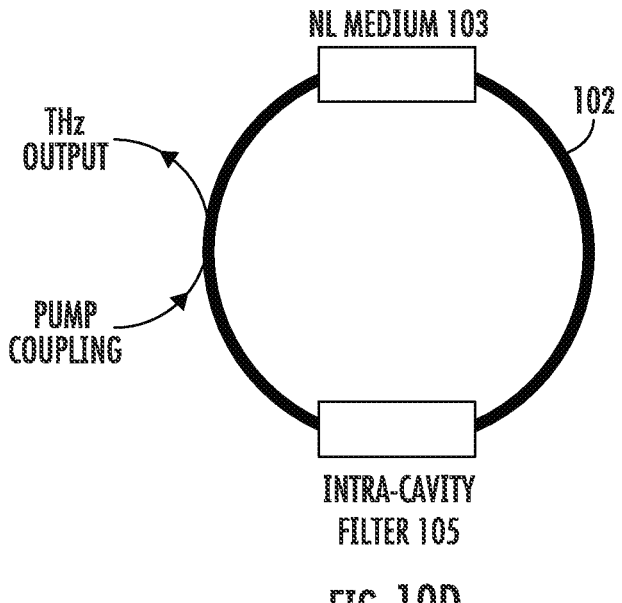
FIG. 10D

~300 μm

IR QUASI-BIC
IN THz CAVITY
110

~cm

IR CAVITIES
FORMING THz BIC
111

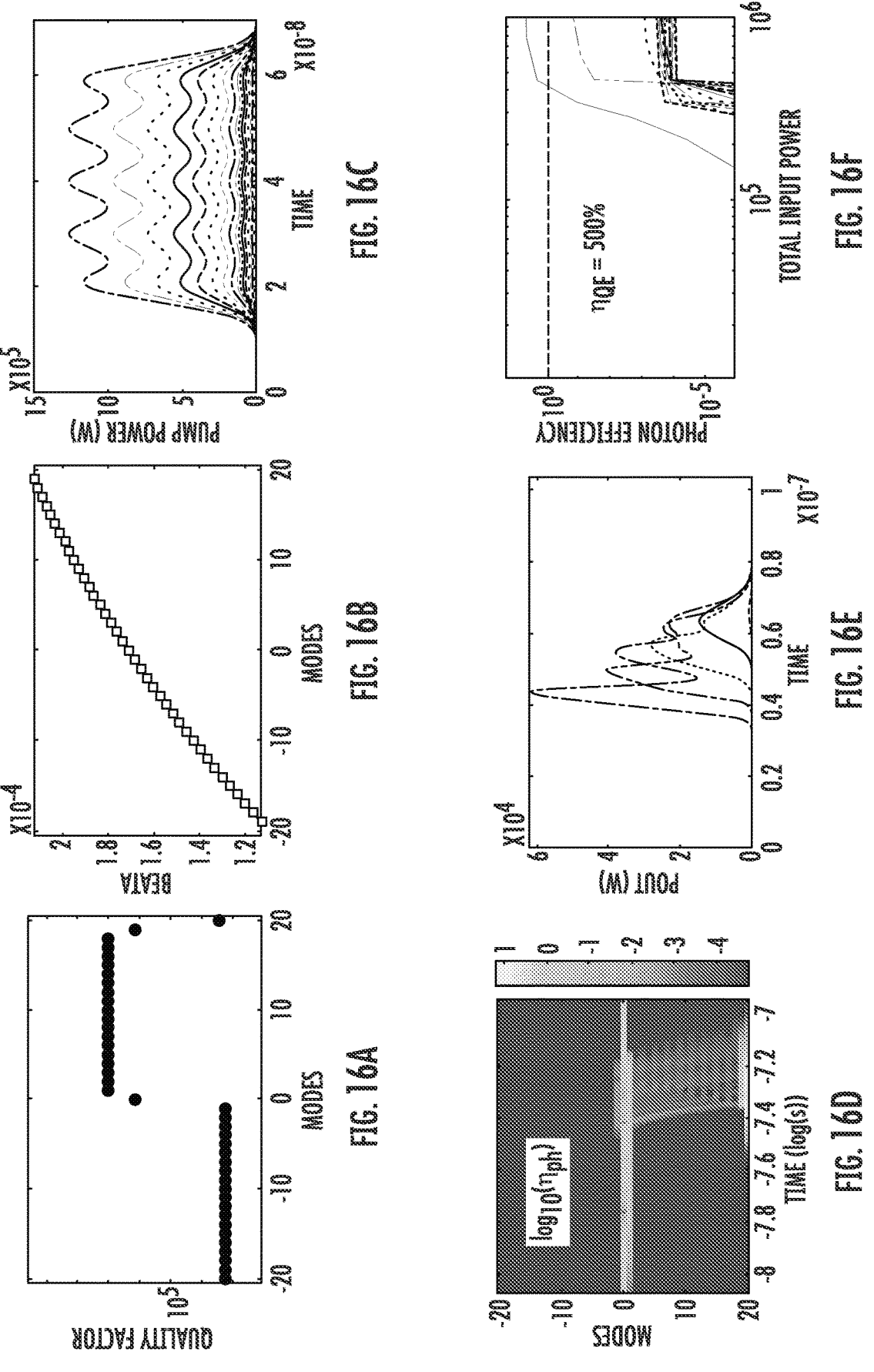

METHODS AND APPARATUS TO GENERATE TERAHERTZ WAVES THROUGH CASCADED NONLINEAR PROCESSES

This application claims priority to U.S. Provisional Patent Application Ser. No. 63/179,726, filed Apr. 26, 2021; and U.S. Provisional Patent Application Ser. No. 63/182,177, filed Apr. 30, 2021, the disclosures of which are incorporated by reference in their entireties.

This invention was made with government support under W911NF-18-2-0048 awarded by the U.S. Army Research Office. The government has certain rights in the invention.

BACKGROUND

Nonlinear frequency mixing is the basis of many coherent light sources not attainable directly from a gain medium. The nonlinear response of non-centrosymmetric crystals to incident pump fields produces higher harmonics and sum and difference frequency terms. The latter is the particular case when a high-energy photon, i.e., short wavelength, referred to as the pump, is down-converted to two lower-energy photons referred to as signal and idler. The sum of the resulting photon energies must satisfy energy conservation, in other words, their sum must equal the pump frequency. If a small seed of signal frequency is present in the crystal, also referred to as the low-frequency pump, one obtains a so-called stimulated parametric down-conversion in which the signal is amplified, in other words, the signal acquires an additional identical photon, and an idler photon is created. This is a commonly used technique to generate a specific idler frequency of interest, also called difference frequency generation (DFG). In this nonlinear process, the resulting wave will inherit the coherence properties from the pump source. Thus, it is a powerful technique to generate single-frequency (or narrow bandwidth, such as quasi-CW) coherent waves in a broad range of wavelengths from terahertz to mid-infrared (MIR). Throughout this disclosure, the terms "idler frequency" and "terahertz frequency" are used interchangeably.

For CW or quasi-CW DFG, the maximal energy conversion efficiency is given by the Manley-Rowe (MR) limit. In an optimal embodiment, every high-energy pump photon $\omega_0$ will simultaneously generate a low-energy idler photon $\omega_i$ and amplify a signal photon $\omega_s$, such that $\omega_i=\omega_0-\omega_s$. The maximum conversion efficiency is then given by the idler to the pump photon energies ratio: $\eta_e=\omega_i/\omega_0$. For example, the maximum conversion efficiency possible from an infrared pump ($\omega_0=2\pi\cdot200$ THz) to a THz frequency ($\omega_i=2\pi\cdot1$ THz) is 0.5%. This means that 99.5% of the energy is going to the signal photon, which might not be of interest and therefore lost. This makes the overall process of generating terahertz frequencies from an infrared pump relatively inefficient.

The idea to use amplified signal photons as a new high-frequency pump to initiate subsequent cascaded nonlinear processes was proposed to improve the energy conversion efficiency of nonlinear light sources and eventually overcome the MR limit. Nonlinear processes are reciprocal, and therefore, red-shifting processes creating lower energy signal and idler (terahertz) photons, also called the stokes generation process, and blue shifting processes combining signal and idler (terahertz) photons to create high-energy photons back (anti-stokes generation process) coexist. Consequently, for broadband systems, competing red-shifted (THz creation) and blue-shifted (THz annihilation) processes cancel any net gain in THz conversion efficiency. In fact, this effect has been used to realize microwave and terahertz seeded infrared frequency combs. Nonetheless, it was predicted that for very broadband THz generation using an ultrafast femtosecond pump source, red-shifted processes can slightly dominate in a long nonlinear crystal due to asymmetric phase-mismatch around the pump wavelength. Experimental evidence of nonlinear cascading processes has been observed via the femtosecond pump's spectral broadening with a quantum efficiency estimated to be 250%. Efficiencies slightly exceeding the MR limit have also been predicted for multimodal cavities. However, only a very limited number of red-shifted nonlinear cascading orders contributed to the enhanced THz generation (due to competing stokes and anti-stokes processes), limiting the quantum efficiency and overall energy conversion efficiency.

Nonlinear frequency conversion has enabled the development of many light sources, ranging from the UV to the far-infrared (FIR) wavelengths, such as terahertz (THz) wavelengths. However, the nonlinear generation of FIR and THz waves from a visible (VIS), near-infrared (NIR) or infrared (IR) source has a fundamental conversion efficiency limit.

Therefore, it would be beneficial if there was a system and method that generates terahertz waves and overcomes this conversion efficiency limit.

SUMMARY

A system and method to overcome the MR limit associated with NIR to THz frequency conversion is disclosed. The method operates by recycling signal photons to initiate cascaded nonlinear processes. Several embodiments that utilize this concept are described, one of them being a multi-mode cavity with engineered modes providing a net THz gain. Several other embodiments are also disclosed that may realize such a scheme for the efficient generation of THz waves. These systems and methods also allow the generation of ultra-high peak intensity in continuous-wave (CW), nano-second, and ultrafast (femtosecond) pumping schemes. This system and method may enable many of the previously envisaged THz wave applications such as spectroscopy, metrology, and communication.

This effect is demonstrated with a coupled-mode theory framework generalized for nonlinear multimode cavities. By engineering the quality factors (Q-factors) of a broadband cavity's many modes, additive cascading of nonlinear processes amplifying a single idler mode is possible. The method enables THz wave generation from an infrared (IR) pump with its quasi-complete depletion, making energy conversion efficiencies from a few percent to 100% possible. Realistic embodiments in free-space and integrated structures are disclosed by considering experimental parameters such as cavity dimension, nonlinear medium, dispersion, and different pump sources. The nonlinear medium can be a conventional non-centrosymmetric crystal, such as GaAs, AlGaAs, $LiNbO_3$, GaSe, DAST, OH1, or more unconventional nonlinear media, including organic crystals, ferromagnetic materials, or ferromagnetic/nonmagnetic alloys, or ferroelectric materials, but not limited thereto.

In an embodiment with a idler/pump frequency ratio of 0.005 and more than 20 cascading orders, an energy conversion efficiency of more than 10% can be achieved, with more than 50 cascading orders an energy efficiency of 25% can be achieved, with more than 100 cascading orders, a theoretical energy efficiency of more than 50% can be achieved, with 199 cascading orders, an energy conversion efficiency of 99% can be achieved, with a idler/pump ratio of 0.01 and more than 40 cascading orders, an energy conversion efficiency of more than 40% can be achieved, and with more than 60 cascading orders, an efficiency of more than 60% can be achieved. Physical structures that realize this efficient energy conversion into THz waves are disclosed and the requirements on structures in terms of physical dimensions of the cavity, nonlinear crystal, dispersion, and frequency detuning are explained. The light source can be realized using pump excitation from visible, infrared or MIR, and can generate frequencies from Microwave to THz, as well as in the FIR and MIR range.

According to one embodiment, a system to generate waves having a terahertz frequency is disclosed. The system comprises a pump having a pump frequency, wherein the pump frequency comprises a visible wavelength, a near-infrared wavelength, an infrared wavelength or a mid-infrared wavelength; a multimodal cavity defined by two or more mirrors, wherein the modes are separated by the terahertz frequency of interest or a fraction of it, and wherein at least one of the two or more mirrors comprises a frequency dependent mirror having a frequency dependent transmissivity or reflectivity profile; and a nonlinear medium disposed within the cavity. In some embodiments, the multimodal cavity comprises at least 2 modes, at least 10 modes, at least 50 modes, or at least 100 modes. In some embodiments, the nonlinear medium comprises one or more of $LiNbO_3$, $LiTaO_3$, $LiIO_3$, $KNbO_3$, $BaTiO_3$, KDP, KTP, BBO, LBO, GaAs, GaP, GaSb, GaSe, ZnSe, ZnTe, CdTe, Cds, CdSe, $AgGaSe_2$, $AgSbS_3$, InP, ZnO, ZGP, CSP, InAs, InSb, Te, $CdGaAs_2$, $CdGeP_2$, DAST, OH1, DSTMS, BNA, LAPC, Fe/Au, Fe/Pt, YIG/Pt, $YIG/Cu_{1-x}Ir_x$, $Ni_{89}Fe_{19}$, $CO_{70}Fe_{30}$, CoFeB alloys, $KNO_3$, $KTa_xNb_{1-x}O_3$, $BaxSr_{1-x}TiO_3$, $SrBaNbO_3$, $K_3Li_2Nb_5O_{15}$, $K_xNa_{1-x}Sr_yBa_{1-y}-Nb_2O_6$, $KH_2PO_4$, $KH_2AsO_4$, $NH_4H_2PO_4$, $ND_4D_2PO_4$, $RbH_2AsO_4$, $KTiOPO_4$, $KTiOAsO_4$, $RbTiOPO_4$, $RbTiOAsO_4$, $CsTiO-AsO_4$, $Pb(ZrxTi_{1-x})O_3$, La-doped $Pb(Zr_x,Ti_{1-x})O_3$, $(1-x)[Pb(Mg_{1/3}Nb_{2/3}O_3)-x[PbTiO_3]$, and $(1-x)[Pb(Zr_{1/3}Nb_{2/3}O_3)-x[PbTiO_3]$, $(0<x<1; 0<y<1)$. In some embodiments, the frequency dependent mirror defines a portion of the cavity and is configured such that reflectivity of modes having a frequency less than the pump frequency comprise a first value, and the reflectivity of at least one mode having a frequency greater than the pump frequency comprises a second value, less than the first value. In some embodiments, the first value is greater than the second value by at least a factor of 2, 10, 100, 500, 1000, 5000 or 10000. In some embodiments, the frequency dependent mirror is disposed within the cavity and is configured such that transmissivity of modes having a frequency less than the pump frequency comprise a first value, and the transmissivity of at least one mode having a frequency greater than the pump frequency comprises a second value, less than the first value. In some embodiments, the first value is greater than the second value by at least a factor of 2, 10, 100, 500, 1000, 5000 or 10000. In some embodiments, the cavity supports at least 5, 10, 20, 50, 100, or 200 cascading orders. In some embodiments, the quantum efficiency of the system is greater than 500%, 1000%, 5000%, 10000% or 20000%. In certain embodiments, at least one of the two or more mirrors comprises a metallic mirror, a Plano (flat) mirror, or a focusing concave or parabolic mirror with off-axis angles varying from 0° to 90°. In certain embodiments, the cavity is arranged as a ring configuration, as a semi-confocal or confocal configuration, or as a bowtie configuration. In some embodiments, the pump comprises a second mode, defined as a seed or low-frequency pump, and wherein the pump frequency and the seed are separated by the terahertz frequency.

According to another embodiment, a system to generate waves having a terahertz frequency is disclosed. The system comprises a pump having at least one mode, wherein at least one mode is defined as a pump frequency, wherein the pump frequency comprises a visible wavelength, a near-infrared wavelength, an infrared wavelength or a mid-infrared wavelength; and a non-linear resonator, wherein the quantum efficiency of the system is greater than 500%. In certain embodiments, the pump further comprises at least a second mode and wherein the second mode is defined as seed or low-frequency pump, and wherein the first mode and the second mode are separated by the terahertz frequency. In some embodiments, the quantum efficiency of the system is greater than 1000%, 5000%, 10000% or 20000%. In some embodiments, a Q-factor of at least one frequency less than the pump frequency is greater than a Q-factor of at least one frequency greater than the pump frequency by at least a factor of 2, 10, 100, 500, 1000, 5000, or 10000. In some embodiments, the non-linear resonator comprises a micro-ring resonator coupled to a second micro-ring resonator. In some embodiments, at least one micro-ring resonator is made from a nonlinear material. In some embodiments, the micro-ring resonator is coupled to an antenna. In certain embodiments, the non-linear resonator comprises a photonic crystal fiber. In certain embodiments, the photonic crystal fiber is made from a nonlinear material. In certain embodiments, the photonic crystal fiber is filled with a nonlinear material. In some embodiments, the non-linear resonator comprises a plurality of cavity resonators. In some embodiments, the nonlinear medium forms the non-linear resonator. In some embodiments, the nonlinear resonator comprises a photonic crystal cavity. In some embodiments, the nonlinear resonator comprises a bound state in the continuum. In certain embodiments, a sharp wavelength transition occurs at the pump frequency, and wherein a sharpness, defined as a derivative of a mirror transmission or absorption versus wavelength, is smaller than twice the terahertz frequency. In certain embodiments, the sharpness is smaller than the terahertz frequency. In certain embodiments, the sharpness is smaller than ½, 5 times, or 10 times the terahertz frequency. In some embodiments, the non-linear resonator comprises a plurality of modes, and wherein at least one mode having a frequency greater than the pump frequency has a Q-factor that is less than a Q-factor of a frequency less than the pump frequency. In some embodiments, the Q-factor of the pump mode is less than the Q-factor of other modes having a frequency less than the pump frequency. In some embodiments, a Q-factor of the mode with the lowest frequency is less than the Q-factor of other modes having a frequency less than the pump frequency. In certain embodiments, the Q-factor of the pump is at least 2 times, 5 times, 10 times, 100 times smaller than the Q-factor of the other modes having a frequency less than the pump frequency. In some embodiments, the Q-factor of the mode with the lowest frequency is at least 2 times, 5 times, 10 times or 100 times smaller than the Q-factor of the other modes having a frequency less than the pump frequency.

BRIEF DESCRIPTION OF THE DRAWINGS

For a better understanding of the present disclosure, reference is made to the accompanying drawings, in which like elements are referenced with like numerals, and in which:

FIGS. 2A-2M shows various embodiments of a nonlinear light source producing high power terahertz waves;

FIG. 4A shows a multi-mode nonlinear cavity;

FIG. 4B shows red and blue-shifted cascaded nonlinear mode mixing;

FIG. 4C shows the temporal evolution of cavity modes for a spectrally symmetric cavity with uniform distribution of the cavity modes Q-factor.

FIG. 4D shows the temporal evolution of cavity modes for a spectrally non-symmetric cavity with sharp wavelength dependence of the modes Q-factors.

FIGS. 6A-6F shows parameters associated with another embodiment;

FIGS. 7A-7F shows parameters associated with another embodiment;

FIGS. 8A-8F shows parameters associated with another embodiment;

FIG. 10A shows a cross section of a photonic crystal fiber, made with or filled with a nonlinear material;

FIG. 10B shows the associated transmissivity profile;

FIGS. 10C-10D shows embodiments where an optical fiber ring resonator is coupled to a nonlinear medium;

FIGS. 16A-16F show the simulation results associated with the embodiment shown in FIG. 15.

DETAILED DESCRIPTION

Figure 1:
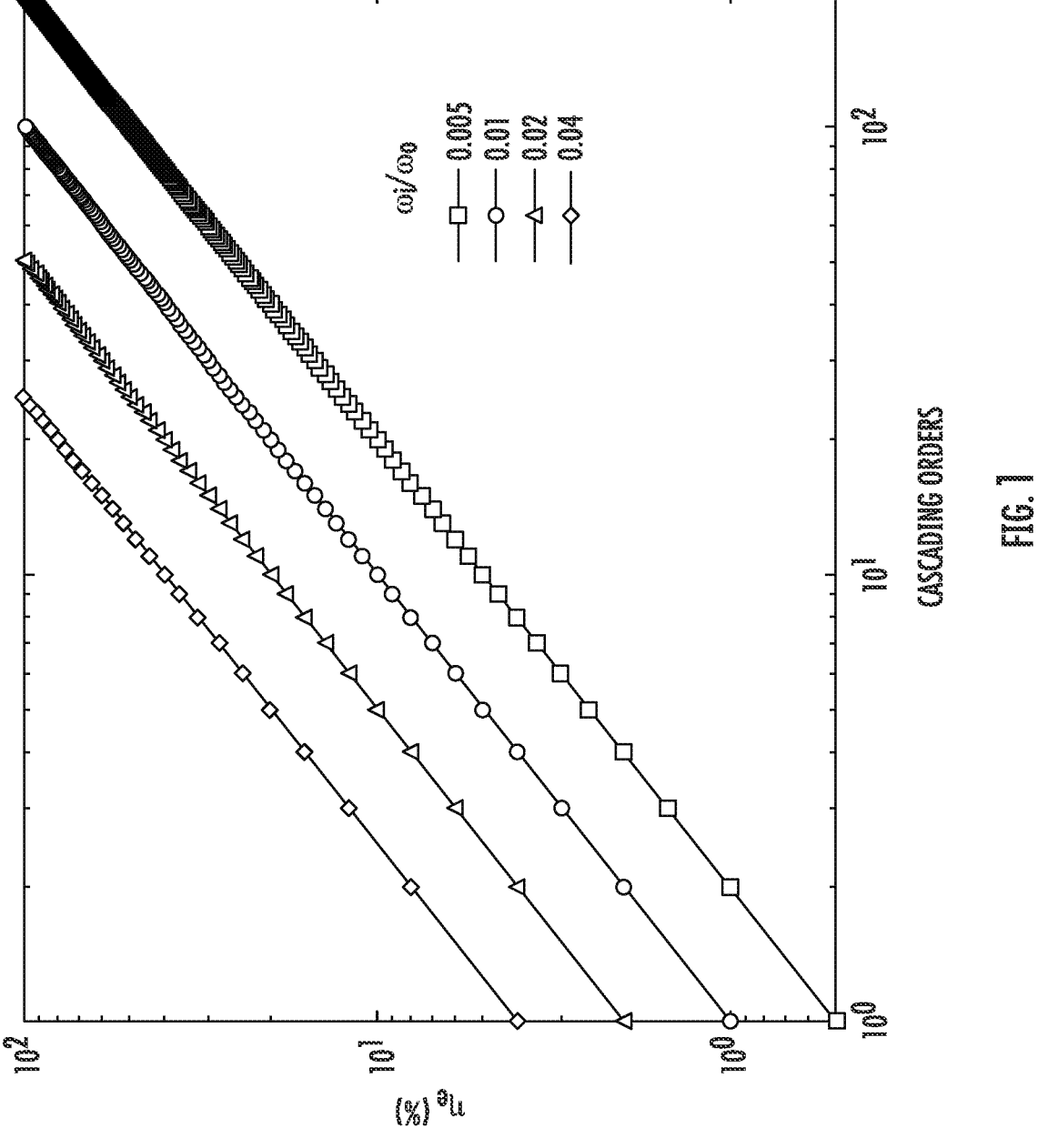
FIG. 1 shows energy conversion efficiencies as a function of cascading orders for different idler/pump frequency ratios ranging from 0.005 to 0.04.

First, the fundamental principle which can enable the generation of CW or quasi-CW difference frequency generation with a quantum efficiency well above 100% is described. This principle can be used to generate high-power THz waves with the complete depletion of an IR pump. Mathematical details, as well as rigorous nonlinear coupled-mode theory simulations showing the validity of the effect are shown. In this disclosure, the term "THz frequency" refers to the spectral range between 0.1 THz and 30 THz.

The general system under consideration is depicted in FIG. 4A. The multimodal nonlinear cavity supports 2N+1 modes centered around the pump frequency $\omega_0$, and equally spaced by the THz frequency $\omega_T$. Note that negative modes are higher frequencies than the pump frequency, while positive modes are lower frequencies than the pump frequency. The pump frequency may comprise a visible wavelength, a near-infrared wavelength, an infrared wavelength or a mid-infrared wavelength.

FIG. 4B shows the multi-frequency mixing with red and blue-shifted cascading orders. Red-shifts (solid lines) indicate a decrease in frequency, while blue-shifts (dashed lines) indicate an increase in frequency. As an example, a red-shift may be represented as $\omega_T=\omega_0-\omega_i$, where $\omega_0$ is the input frequency, $\omega_i$ is the output frequency and $\omega_T$ is the THz frequency. In other words, a photon with frequency $\omega_0$ enters the cavity and is split into two photons, one of energy $\omega_i$ and one with energy $\omega_T$. Thus, in red shifts, photons of the desired frequency, $\omega_T$, are created. Conversely, a blue-shift may be represented as $\omega_i+\omega_T=\omega_0$. Thus, in blue shifts, a photon of the desired frequency is consumed to create a photon with higher energy.

The time-evolution of the system can be described by a set of nonlinear coupled-mode equations:

$$\dot{a}_n = i(\omega_n + \delta\omega_n)a_n - \gamma_n a_n - i\omega_n\beta_n a_T a_{n+1} - i\omega_n\beta_n a_T^* a_{n-1} + \sqrt{2\gamma_n}\, s_n^+,$$

where $a_n$ is the amplitude of the mode with index $n\in[-N,N]$, with frequency $\omega_n$, detuned by $\delta\omega_n$, decay rate $$\gamma_n = \frac{\omega_n}{2Q_n},$$

and effective nonlinear coupling coefficient $\beta_n$. The mode n is pumped with input power $$s_n^+ \cdot \dot{x}$$

denotes the total time-derivative of the variable x. Only modes 0 and 1 are pumped with $$s_0^+ \gg s_1^+,$$

as shown with arrows in FIG. 4B. The mode amplitudes are normalized such that $|a_n|^2$ is the energy in mode n. Additionally, the THz mode amplitude is given by $$\dot{a}_T = i\omega_T a_T - \gamma_T a_T - i\omega_T\beta_T \sum_{n=-N}^{N-1} a_n a_{n+1}^*.$$

First, consider an ideal situation where frequency detuning $\delta\omega_n$ may be neglected. Consider an embodiment with N=24 cascading orders and compare the behavior between a traditional cavity with uniform Q's distribution, and an asymmetric cavity with a wavelength dependent modes' Q-factors. FIG. 4C shows the time-evolution (left panel) and steady-state (right panel) of the mode energies $|a_n|^2$ for a uniform cavity. It can be seen how the energy from the pump is initiating the red and blue shifted processes symmetrically. Thus, the uniform distribution of Q-factors results in an even energy decay around the pump mode which severely limits the THz generation efficiency ($\eta_e$=0.05%). In other words, blue-shifts and red-shifts are equally likely, so there is very low efficiency of photons with frequency $\omega_T$.

Note that if red-shifted cascaded processes are favored over blue processes, the THz generation efficiency improves. This is because there are an increased number of cascading orders contributing to the terahertz wave amplification. Thus, by Q-engineering the multimodal cavity, more specifically by considering low-Q blue-shifted modes $Q_b$ and high-Q red-shifted modes $Q_r$, more red-shifted processes occur. In certain embodiments, $Q_r$ may be greater than $Q_b$ by at least a factor of 2. In certain embodiments, $Q_r$ may be greater than $Q_b$ by at least a factor of 10. In certain embodiments, $Q_r$ may be greater than $Q_b$ by at least a factor of 100. In certain embodiments, $Q_r$ may be greater than $Q_b$ by at least a factor of 500. In certain embodiments, $Q_r$ may be greater than $Q_b$ by at least a factor of 1,000. In certain embodiments, $Q_r$ may be greater than $Q_b$ by at least a factor of 5,000. In certain embodiments, $Q_r$ may be greater than $Q_b$ by at least a factor of 10,000.

Note that, in certain embodiments, the modes with indices 0 and N, may be assumed to have a lower Q-factor such that $Q_b < Q_{0,N}$, and $Q_{0,N} < Q_r$, as described in more detail below. FIG. 4D shows the time-evolution (left panel) and steady-state (right panel) of the mode energies $|a_n|^2$ for an asymmetric cavity. The asymmetric Q distribution strongly favors red-shifted processes, thus resulting in a significant conversion efficiency enhancement of $\eta_e \approx 10\%$. Note that there is little energy in modes −1 through −N. In fact, the amount of energy in modes less than −5 is so small, that they are not shown in FIG. 4D

Figure 5A:
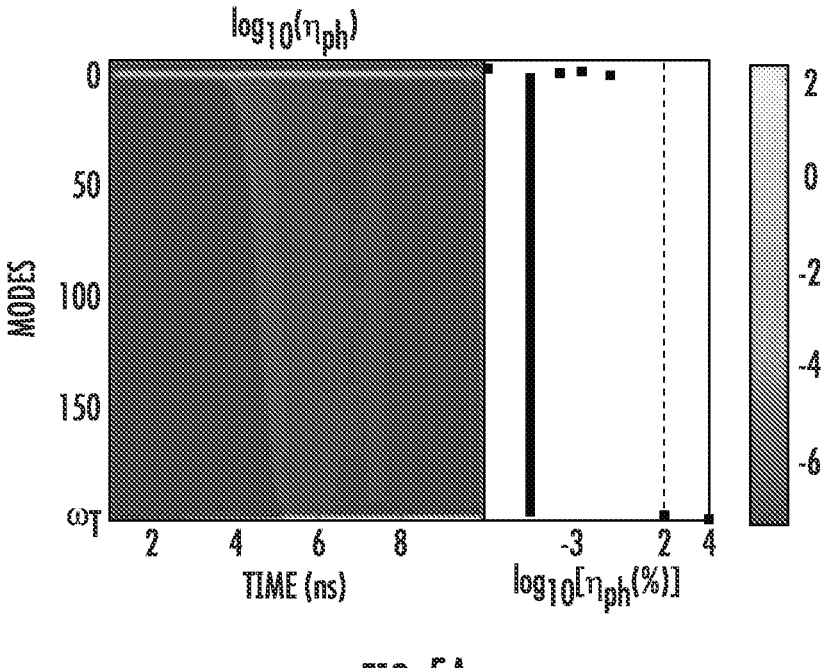
FIG. 5A shows the temporal evolution of photon efficiency for a spectrally non-symmetric cavity with 199 red-shifted cascading orders.
Figure 5B:
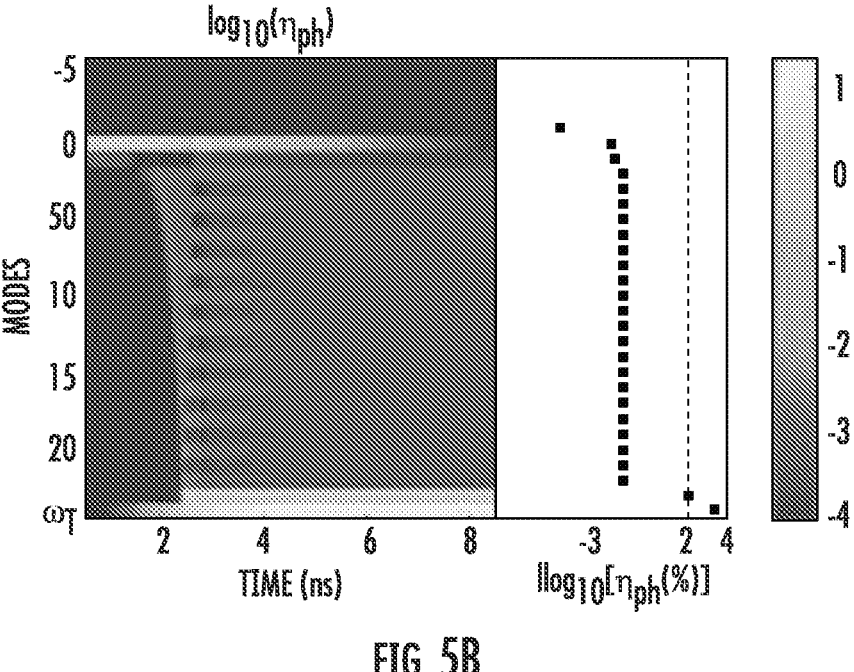
FIG. 5B shows the temporal evolution of photon efficiency for a spectrally non-symmetric cavity with 24 red-shifted cascading orders.

In one embodiment, with a Q-engineered multimodal cavity of N=199 red-shifted modes ($\omega_0 = 2\pi \cdot 200$ THz, $\omega_T = 2\pi \cdot 1$ THZ), a theoretical THz energy conversion efficiency around 99% is possible. FIG. 5A shows how most of the energy flows through the red-shifted modes, contributing to a THz photon generation at each step. It can be seen how all the pump energy is flowing downwards (low synthetic dimension, smaller frequencies), amplifying the THz mode. At steady state, the photon efficiency shows that a single pump photon produced 197 $\omega_T$ photons ($\eta_{QE} = 19,700\%$) and one $\omega_N$ photon. This corresponds to an energy conversion efficiency of more than $\eta_e \approx 99\%$. This is a quasi-full depletion of the pump energy into the THz mode and almost a 200-fold enhancement compared to the conventional MR limit when considering a single difference frequency generation process. FIG. 5B shows another example, comprising a Q-engineered multimodal cavity of N=24 red-shifted modes. A quantum efficiency of over 2,100% is attainable, corresponding to an energy efficiency of more than $\eta_e \approx 11\%$. A similar behavior is possible with smaller or larger N red-shifted modes, with examples of achievable quantum efficiencies depicted in FIG. 1.

In FIG. 1, the energy conversion efficiency is plotted as a function of the number of cascading orders for different idler/pump frequency ratios. One can see that the energy conversion efficiency can reach up to $\eta_e = 100\%$ if all modes are converted. For example, more than 10 cascading orders for an idler/pump frequency ratio of 0.005 corresponds to a quantum efficiency of more than 1,000%, resulting in an energy conversion efficiency of more than 5%, more than 10 times larger than the MR limit, while more than 50 cascading orders for an idler/pump frequency ratio of 0.01 corresponds to a quantum efficiency of more than 5,000%, resulting in an energy conversion efficiency of more than 50%, more than 50 times larger than the MR limit.

Thus, the cavity may comprise any number of modes. In certain embodiments, the cavity comprises at least 2 modes. In some embodiments, the cavity comprises at least 10 modes. In certain embodiments, the cavity comprises at least 50 modes. In some embodiments, the cavity comprises at least 100 modes. In some embodiments, the cavity comprises at least 200 modes.

Figure 9A:
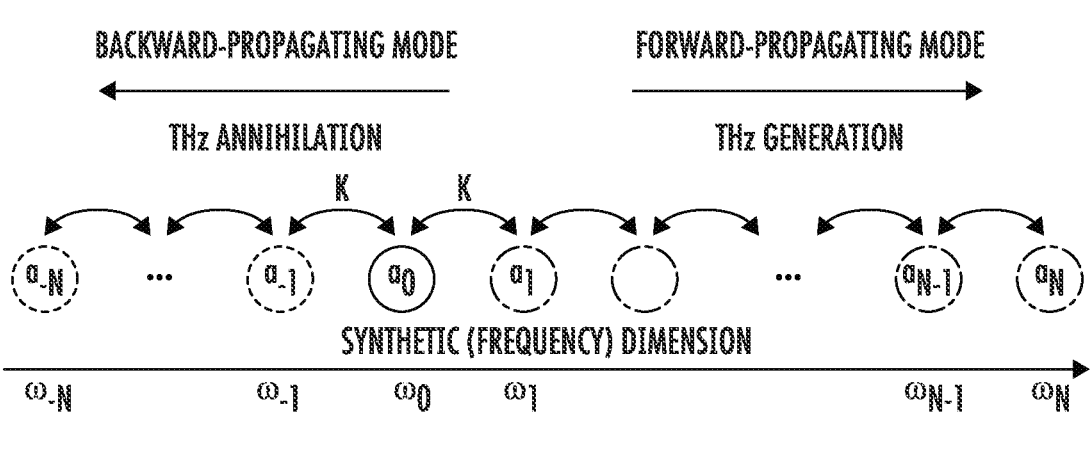
FIGS. 9A-9B show a coupled resonator optical waveguide analogy and topologically-protected THz generation.

Interestingly, the system under study may be modeled as a resonator chain coupled along a synthetic dimension in the tight-binding approximation. Modes −N to N are coupled along with the synthetic dimension corresponding to the mode frequency $\omega$, as shown in FIG. 9A. In real space, such tight-binding configurations are known to be efficient waveguiding systems, and the corresponding concept is known as Coupled Resonator Optical Waveguides (CROW). Assuming fast decay of the THz signal compared to the red-shifted IR modes, only nearest-neighbor modes can couple along this synthetic dimension through an effective nonlinear coefficient $\kappa = i\omega_n \beta_n \alpha_T \ll Q_r$. In this scheme, the pumping and Q distributions are chosen to favor the excitation of a forward propagating mode along with the mode index direction N (towards decreasing values in synthetic frequency space $\omega$). Importantly, the mode N at the end of the chain is chosen to minimize reflection at the boundary of the synthetic dimension with $\gamma_N \sim \kappa$ (since a backward propagating wave would result in THz annihilation). In this embodiment, THz generation corresponds to modes propagating along the array in the forward (red-shifted modes) direction in the synthetic frequency dimension. Similar analogies can be made using concepts like impedance matching, scattering potentials and others. In particular, one may notice the useful connection to the so-called reflectionless eigenchannels, with a coherent input which guarantees perfect transmission for a given scattering potential.

Figure 9B:
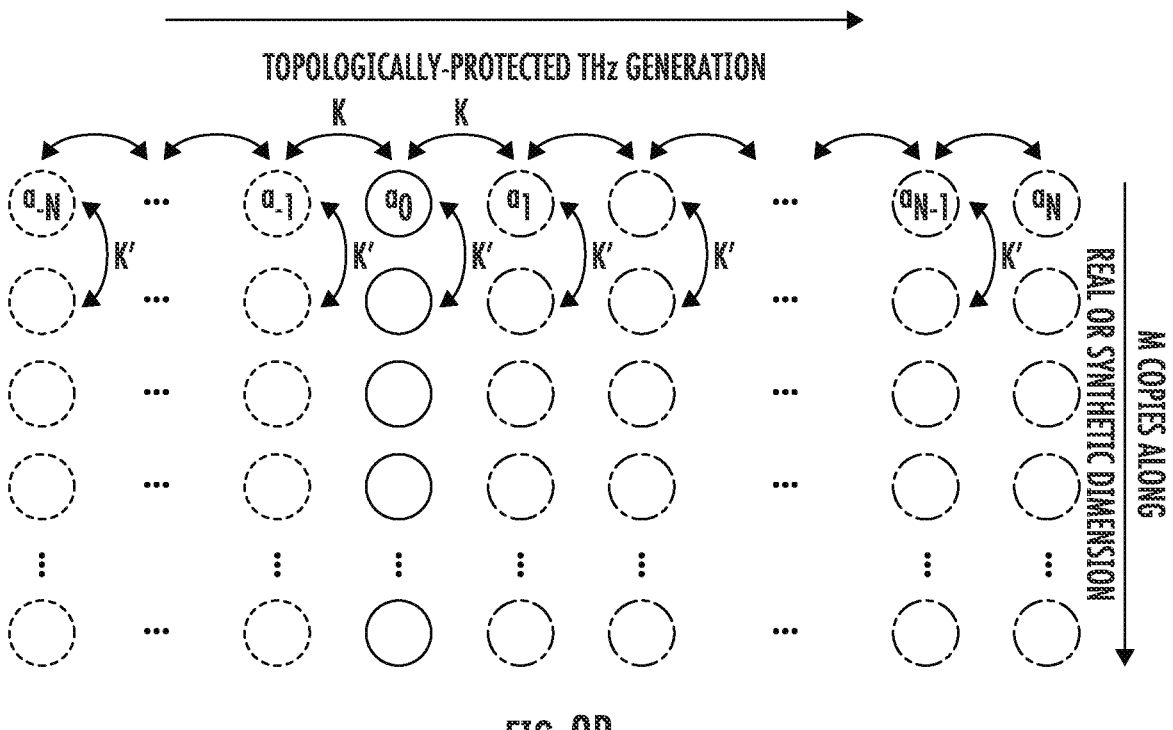

In certain embodiments, the possibility of backward propagation and subsequent THz annihilation can be problematic in achieving high-efficiency THz generation. Therefore, according to another embodiment, the resonator chain along the synthetic dimension is copied M times along another (synthetic or real) dimension, thus resulting in a 2D array of coupled resonators, as shown in FIG. 9B. The coupling ($\kappa'$) between resonators is designed so that the array exhibits topological properties. Both couplings $\kappa$ and $\kappa'$ may be position-dependent or non-reciprocal. The resulting two-dimensional array comprises topological modes and corresponding edge states which propagate unidirectionally. For instance, these couplings can be chosen so that the array presents chiral edge states, which can only propagate along a given direction along the edge of the array (i.e., the synthetic frequency dimension). In this embodiment, backward propagation of the edge mode corresponding to THz annihilation is topologically forbidden (or equivalently the forward propagation of the edge mode corresponding to THz creation is topologically protected).

In other words, by reducing the coupling between $\omega_0$ and $\omega_1$ and between $\omega_{N-1}$ and $\omega_N$ (as compared to the coupling between $\omega_x$ and $\omega_{x+1}$, where x is between 1 and N−2), reflections may be reduced. Thus, the Q-factors of the $\omega_o$ and $\omega_N$ modes may be different than the Q-factors ($Q_r$ or $Q_n$) for the rest of the red-shifted frequencies. Further, in some embodiments, the Q-factor of the THz mode ($\omega_T$) may be different and may be smaller than $Q_r$.

Having described the physics associated with this system, the basic components of the light source based on the intracavity cascaded nonlinear frequency generation and possible embodiments are now disclosed.

This light source comprises one or more pump sources, a multi-mode cavity or multiple coupled single-mode resonators, and one or more embedded nonlinear crystals. In this light source, there is a sharp wavelength dependence of the loss, or coupling rate. The dependence may be external, such as from the cavity coupling mirror, or internal, such as from an intra-cavity absorptive filter. The pump source may be CW or pulsed. Possible pulse widths range from millisecond or microsecond to nanoseconds and femtosecond. In one embodiment, the pump source linewidth should be smaller than the cavity mode linewidth to excite a single longitudinal mode.

First, ultra-efficient conversion efficiencies are quantified and essential figures of merit and quantities that describe the proposed devices' performance are defined. The main figures of merit for the nonlinear light source are:

(1) the photon efficiency, also referred to as the quantum efficiency $\eta_{QE}$, and (2) energy efficiency $\eta_e$.

For a single-stage nonlinear process in which all the incident photons are converted to idler and signal photons, the quantum efficiency reaches a maximum of 1 (or 100%). The energy conversion efficiency is defined in the case of no seed (zero power at the signal frequency $\omega_s$) as the ratio between the generated idler power and the pump power, expressed as $$\eta_e = \frac{P_i}{P_0} \leq \frac{\omega_i}{\omega_0}.$$

The energy conversion efficiency can be normalized by the pump to idler frequency ratio, leading to the quantum efficiency, $$\eta_{QE} = \frac{P_i}{P_0} \frac{\omega_0}{\omega_i} \leq 1.$$

If the signal is non-zero at the input, the total quantum efficiency for the idler frequency is defined as $$\eta_{QE} = \frac{P_i}{P_0 + P_s} \frac{\omega_0}{\omega_i} \leq 1.$$

It follows that for a single-stage nonlinear frequency mixing, the maximum quantum efficiency is 1 (or 100%). When cascading nonlinear processes are possible, the energy converted to the signal frequency is used to initiate subsequent nonlinear frequency mixing processes to amplify the original idler frequency. This way, multiple idler photons are generated from a single pump photon through the cascading nonlinear processes, and the quantum efficiency of the conversion process from initial pump frequency to idler frequency becomes much larger than 100%. For example, in an embodiment with more than 50 cascading orders, one can achieve a quantum efficiency of more than 5,000%. In the following, the idler frequency is referred to as the generated terahertz frequency $\omega_T$.

This arrangement of components produces a light source that not only improves the overall conversion efficiency but enables high-power terahertz sources. With the addition of the Q-engineered sharp wavelength dependent resonator, this light source can overcome the MR limit by more than an order of magnitude. The systems and methods discussed herein lead to the generation of high-power, single-mode, and tunable single-frequency (or narrow-bandwidth) light sources spanning the microwave, THz, and MIR range.

In one embodiment, the light source for terahertz generation may be realized using a broadband resonator with a sharp wavelength dependence coupled to a nonlinear medium and excited by a pump source. Explicit parameters of the device for some of the embodiments are described below.

In certain embodiments, the optical resonator may be based on, for example, free space, fiber based or integrated implementations.

Figures 2L, 2M:
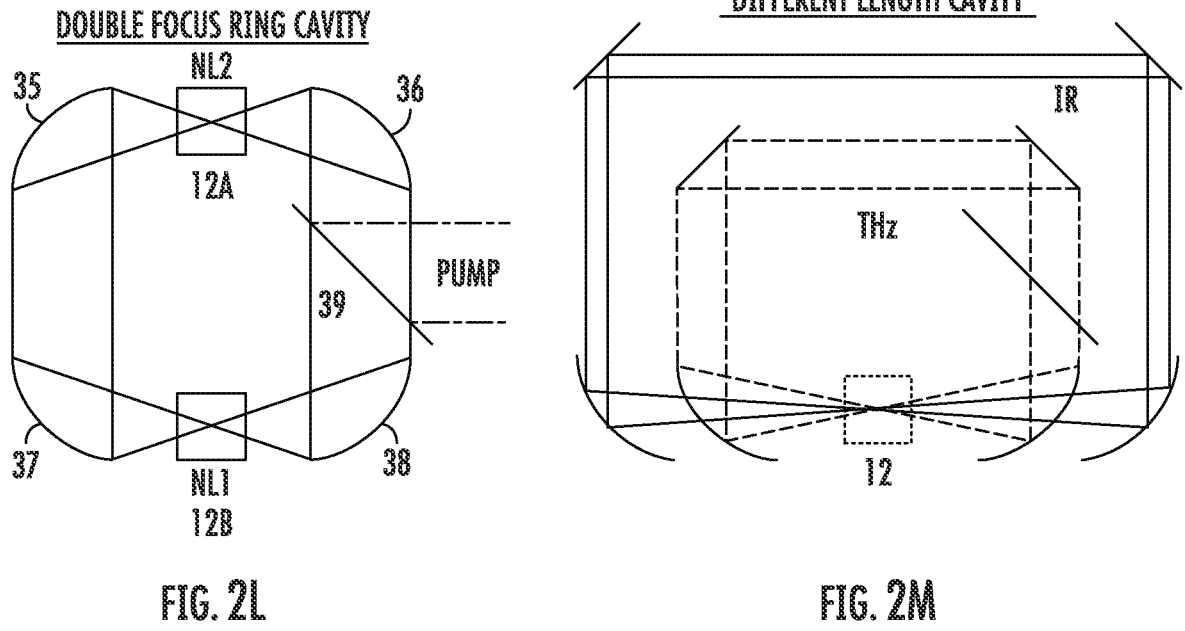

FIGS. 2A-2M show a various of structures for producing high power terahertz waves. In FIG. 2A, a nonlinear medium 12 is embedded in a cavity formed by two concave mirrors 10, 11. The pump is introduced through one of the mirrors 10 and the generated THz wave may be coupled out from the other mirror 11. The mirror 10 may have a wavelength dependent reflectivity, as shown in FIG. 2B. In FIG. 2B, red-shifted modes contributing the THz amplification, blue-shifted modes and the THz mode are shown. For example, the reflectivity may have a first value, such as close to 100%, at wavelengths between $\lambda_0$ and $\lambda_N$. Reflectivity at wavelengths shorter than $\lambda_0$ may have a second value, such as close to 0%. In certain embodiments, at least one mode having a wavelength shorter than $\lambda_0$ may have a reflectivity having the second value. The mirror 10 may have a wavelength dependent reflectivity with sharp transitions at the pump ($\lambda_0$) and N ($\lambda_N$) modes. The mirror 10 is also reflective for THz frequency ($\lambda_T$), although the reflectivity may be a different value than the first value. In certain embodiments, the first value is greater than the second value by at least a factor of 2. In other embodiments, the first value is greater than the second value by at least a factor of 10, 100, 500, 1,000, 5,000, 10,000 or more.

In FIG. 2C, a cavity is shown comprising three mirrors, two concave or off-axis parabolic (OAP) mirrors 14, 15 and one flat mirror 16, wherein the flat mirror 16 may have a reflectivity profile similar to that shown in FIG. 2B. In this embodiment, the pump and the THz frequency both pass through the flat mirror 16. This may be referred to as a ring configuration.

In FIG. 2D, a flat mirror 17 and a second mirror 18, which may be concave or flat, are used to form the cavity. The flat mirror may have a reflectivity profile similar to that shown in FIG. 2B. The pump passes through the flat mirror 17 and the THz frequency is coupled out through the second mirror 18. This may be referred to as a semi-confocal configuration, or Fabry-Perot in the case of two flat mirrors.

In FIG. 2E, two flat mirrors 19, 20 and two curved mirrors 21, 22 are used to form a cavity. The curved mirrors 21, 22 may be concave or OAP mirrors. The flat mirror 20 may have a reflectivity profile similar to that shown in FIG. 2B. In this embodiment, the pump and the THz frequency both pass through the flat mirror 20. This may be referred to as a bow-tie configuration.

FIG. 2F shows a four mirror ring cavity with an intra-cavity transmission mirror 27. In certain embodiments, there are two curved mirrors 23, 24, which may be OAP mirrors and two flat mirrors 25, 26. In this embodiment, the THz frequency is partially reflected by the intra-cavity transmission mirror 27. The intra-cavity transmission mirror may have the transmissivity profile shown in FIG. 2G. In FIG. 2G, red-shifted modes contributing the THz amplification, blue-shifted modes and the THz mode are shown. For example, the transmissivity may have a first value, such as close to 100%, at wavelengths between $\lambda_0$ and $\lambda_N$. Transmissivity at wavelengths shorter than $\lambda_0$ may have a second value, such as close to 0%. In certain embodiments, only one, or few modes having a wavelength shorter than $\lambda_0$ may have a transmissivity close to 0%. The intra-cavity transmission mirror 27 has a wavelength dependent transmissivity with sharp transitions at the pump ($\lambda_0$) and N ($\lambda_N$) modes. In certain embodiments, best efficiency is achieved when transmissivity for pump ($\lambda_0$) and N ($\lambda_N$) modes is equal. In other embodiments, transmissivity for pump ($\lambda_0$) and N ($\lambda_N$) modes can be different. The intra-cavity transmission mirror 27 is also transmissive for THz frequency ($\lambda_T$), although the transmissivity may be a different value than the first value. Further, the angle of the intra-cavity transmission mirror 27 can be used to adjust the transition edge, allowing for a precise control of the pump ($\lambda_0$) and N ($\lambda_N$) modes Q-factor, as depicted in FIG. 2I.

FIG. 2H shows another cavity having three metallic mirrors 28, 29, 30, where two of these mirrors may be curved. An intra-cavity mirror 31 may be disposed in the cavity, and may have a transmissivity profile similar to FIG. 2G. Further, as described above, the angle of the intra-cavity mirror 31 may be adjusted to adjust the transition edge.

FIG. 2J shows another cavity have two mirrors 32, 33. An intra-cavity mirror 34 is disposed in the cavity and may have a transmissivity similar to that shown in FIG. 2K.

FIG. 2L shows a four OAP ring-resonator with two nonlinear media 12A, 12B, each located at the focal point of the OAP mirrors 35, 36, 37, 38. An intra-cavity mirror 39, having the transmissivity profile similar to that of FIG. 2G, is disposed in the cavity.

FIG. 2M shows two cavities for respectively IR and THz frequencies nonlinearly coupled using OAP mirrors with through hole to separate the IR and THz modes. In other words, in some embodiments, the wavelengths can be separated using parabolic mirrors with a through hole in the center. The IR pump and signals can pass through the hole, while the longer idler wavelength (terahertz) is reflected by the mirror. In another embodiment, a dichroic mirror can be used to separate the different wavelengths.

While FIGS. 2A-2M described the reflectivity or transmissivity of the mirrors, in other embodiments, the mirrors are formed so as to absorb energy. This absorption may be wavelength dependent. Note that in each embodiment, one or more nonlinear media 12 are disposed in the cavity.

Figure 3A:
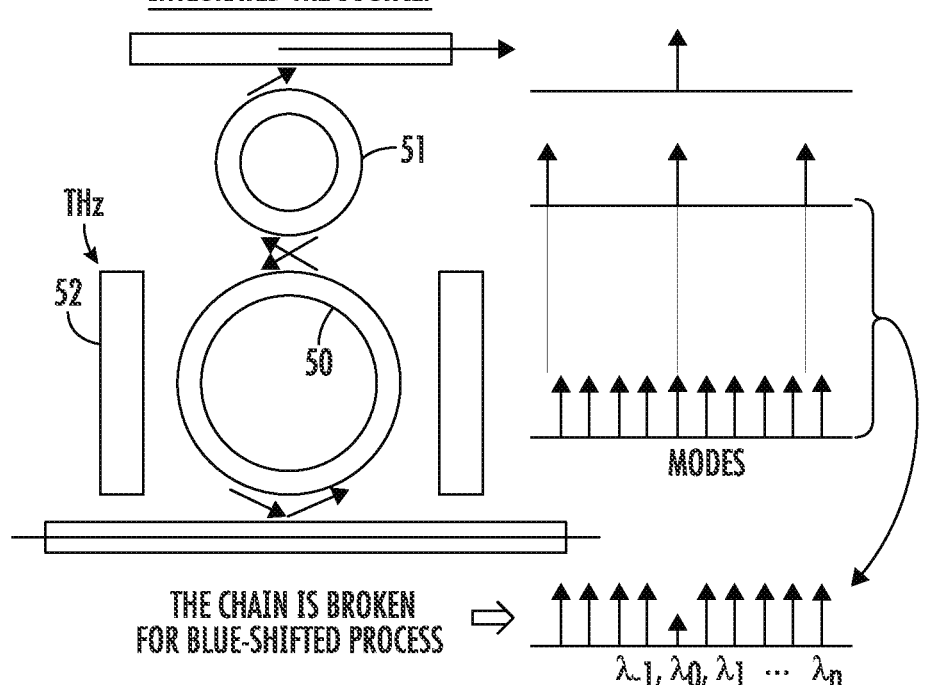
FIG. 3A shows an example structure of an integrated non-linear light source producing high power terahertz waves.
Figure 3B:
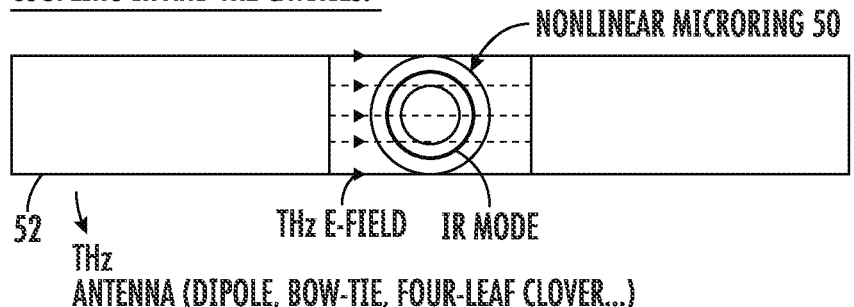
FIG. 3B-3C shows a top view and cross-sectional view of the coupling of the IR and THz cavities, respectively.
Figure 3C:
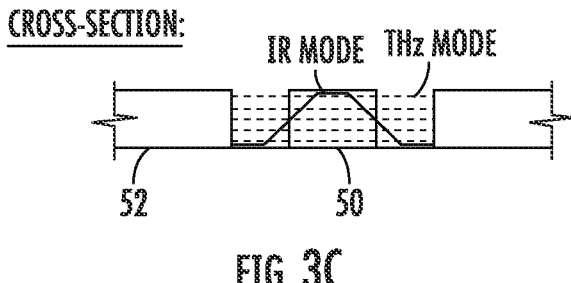

FIG. 3A shows an example structure of an integrated nonlinear light source producing high power terahertz waves. In one embodiment, an integrated nonlinear micro-ring resonator 50 is used with a free-spectral range integer to the THz frequency of interest, as shown in the graph next to the micro-ring resonator 50. One can introduce a spectral dependence in the modes by coupling a second micro-ring resonator 51 with a larger free-spectral range (smaller diameter), as shown in the graph next to the second micro-ring resonator 51, and align the modes around a blue-shifted mode. This way the energy can couple through the second micro-ring resonator 51 breaking the blue-shifted modes link. Spatial overlap and confinement of the THz mode can be provided with, for example, an antenna 52, as shown in FIGS. 3B-3C. The antenna 52 can take various shapes such as dipole, bow-tie or four-leaf-clover structures. Alternatively, a photonic crystal cavity may be disposed around the micro-ring resonator 50 to provide THz mode confinement.

FIGS. 2A-2M and 3A-3C show a variety of embodiments that may be used to construct a light source having high power terahertz waves. However, the disclosure is not limited to these embodiments.

For example, the resonator may be a bow-tie cavity, a ring resonator, a Fabry-Perot cavity, a confocal or semi-confocal cavity, or other types of mirror cavities.

With respect to FIGS. 3A-3C, the ring resonator can also be implemented with waveguides such as single or multi-mode fibers, or photonic crystal fibers, or in an integrated optics scheme using strip, embedded strip, rib, ridge channel waveguides, or photonic crystal defect waveguide, other types of optical guiding structures. Examples of more compact resonators, which may be preferred for integrated implementation, may be: an antenna, a micro-ring resonator, a photonic crystal resonance mode (including Fano resonances or bound states in the continuum), a photonic crystal cavity, nanobeam cavity, a whispering gallery mode, Mie-resonant dielectric structures, or other localized optical modes.

Further, there is no a priori restriction on whether the cavity is wavelength-scale or macroscopic. Therefore, cavity dimensions can vary from 100 nm (integrated embodiments) to a few-meter scale (free-space embodiments). Additionally, the cavity length for the pump and cascading orders and the idler frequency can either be the same or of different length(s).

As shown in FIGS. 2A-2M, in some embodiments, the resonator is formed by optical components such as mirrors. The mirrors forming the cavity can be metallic, including bare or protected Au, Ag, Al, or dielectric with visible, or infrared coatings. In certain embodiment, Plano (flat) mirrors, or focusing concave or parabolic mirrors with off-axis angles varying from 0° to 90°, or a combination thereof, may be used to form the optical cavity. Further, there is no a priori restriction on the number of mirrors forming the cavity. Therefore, a cavity can be formed by zero, two or more mirrors. The focal length of the focusing mirror can vary from millimeter, centimeter, and meter scale to infinity for Plano mirrors.

As shown in FIGS. 3A-3C, in certain embodiments, the resonator is based on waveguides such as optical fibers or in the form of integrated optics.

In certain embodiments, the resonator is formed by a photonic crystal fiber made completely, or partially from a nonlinear medium, or can be infiltrated with a nonlinear medium. In some embodiments, the cross-section of the photonic crystal fiber can be engineered to provide a sharp wavelength dependent transmission.

In certain embodiments, the resonator comprises an integrated photonic crystal waveguide made from completely, or partially form a nonlinear medium. The photonic crystal waveguide dispersion can be engineered to provide a sharp wavelength dependent cavity.

For example, FIG. 10A shows a cross section of a photonic crystal fiber 100, which can be made from a nonlinear material 101 or filled with a nonlinear material 101. The transmission may be engineered to have a wavelength dependent profile, such as is shown in FIG. 10B. FIGS. 10C-10D show standard optical fiber rings 102 coupled to a nonlinear medium 103. In FIG. 10C, wavelength dependence is achieved by coupling to a secondary ring resonator 104. In FIG. 10D, wavelength dependence is achieved with an intracavity filter 105.

Figure 11A:
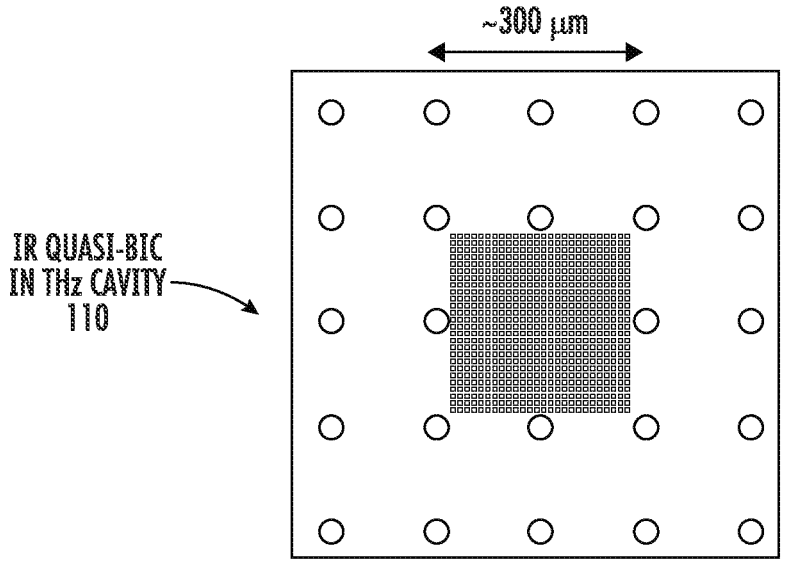
FIG. 11A shows an IR BIC disposed in a THz cavity.
Figure 11B:
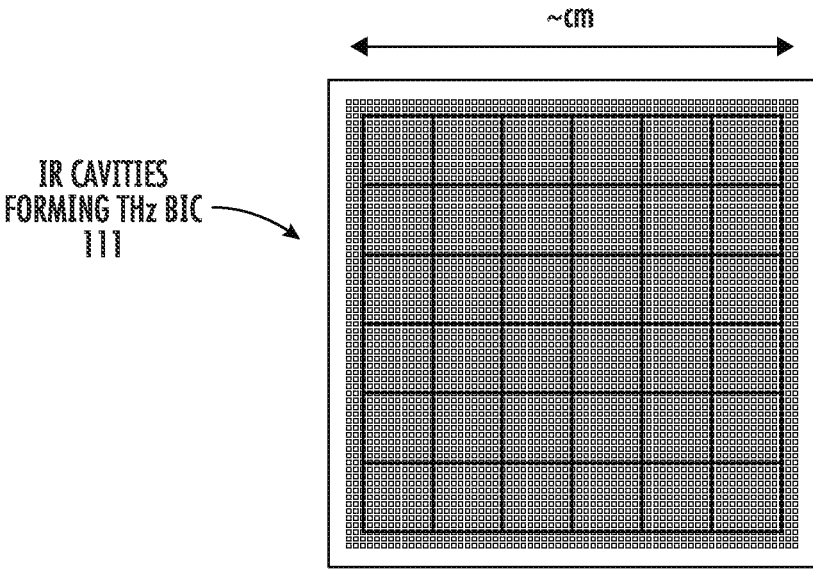
FIG. 11B shows IR cavities forming a THz BIC.

In one embodiment, the resonator is based on optical confinement achieved through, for example, index variation or total internal reflection. Examples of structures are photonic crystal cavities, bound-state in the continuum (BIC), micro-ring antennas, and other resonators, types of high-Q optical confinement structures. In certain embodiments, the cavity can have different dimensions for different wavelengths (modes). In some embodiments, the cavity spectral response can be engineered to a sharp wavelength dependence. FIG. 11A shows an infrared BIC 110 disposed in a THz cavity, while FIG. 11B shows IR cavities 111 forming a THz BIC.

In some embodiments, the light source comprises one, two or more cavity resonators. The individual resonators can be either one listed above, or any other type of resonator. The individual resonators can be the same type or be of different types.

In some embodiments, such as that shown in FIGS. 3A-3C, the VIS, IR or IR multimode resonator is a ring-resonator, while the THz resonator is an antenna or a photonic crystal cavity.

As shown in FIGS. 2A-2M, the optical resonator is coupled with a nonlinear medium 12. In certain embodiments, the nonlinear medium 12 can be a separate material. A single medium or multiple nonlinear media can be coupled to the resonator.

Figure 12A:
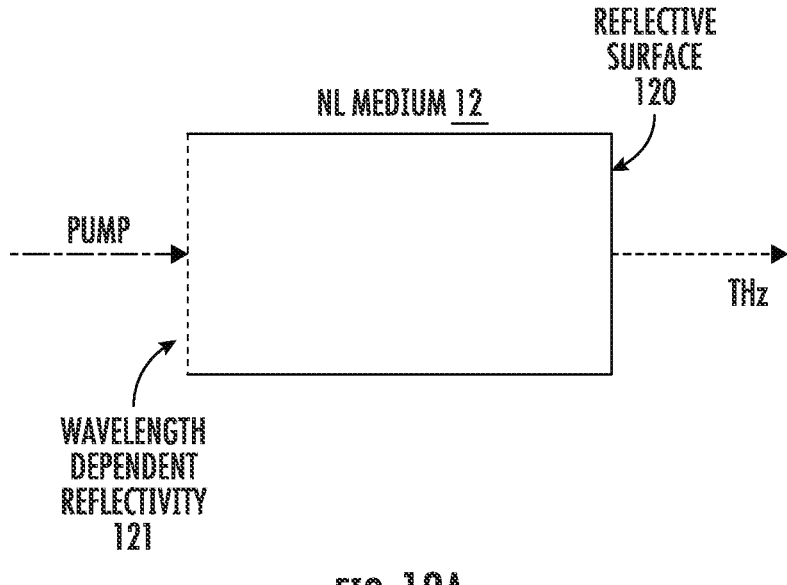
FIGS. 12A-12B show two examples of a resonator formed of a nonlinear medium.
Figure 12B:
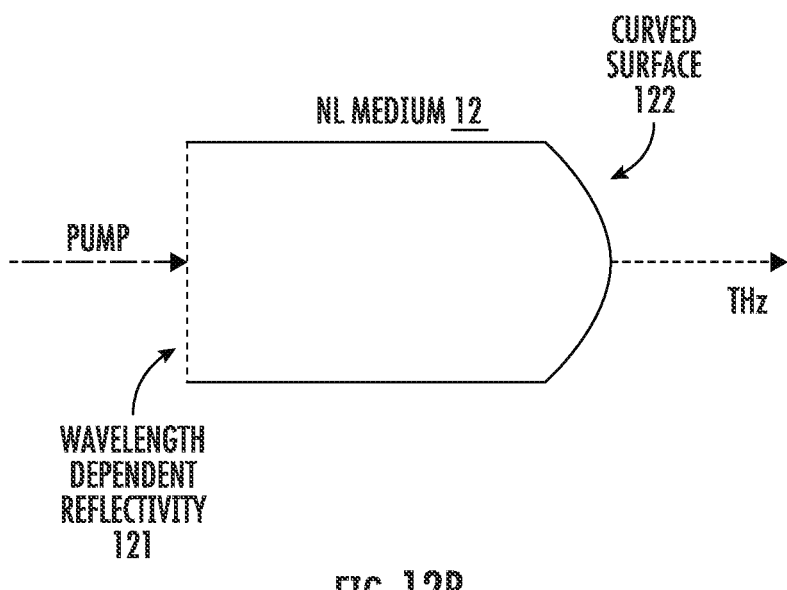

In some embodiments, the resonator is made of the nonlinear medium. The resonator can be multimode from a single medium, or multimode operation can be provided by multiple individual resonators coupled together. In certain embodiments, the nonlinear medium can be the cavity resonator. One, two or more facets of the nonlinear medium can be coated or polished to provide wavelength dependent or broadband reflective properties. FIGS. 12A-B show two examples of a resonator formed of a nonlinear medium. FIG. 12A shows a nonlinear medium 12 having a reflective surface 120 and a wavelength dependent reflective surface 121, where both surfaces are flat. FIG. 12B shows a non-linear medium having a curved reflective surface 122 and a wavelength dependent reflective surface 121, which is flat.

As explained above, the cavity transmission or absorption exhibits a sharp frequency dependence, such that, in the former case, the cavity leakage rate, or in the latter case, the cavity internal absorption rate, is wavelength dependent. The sharp wavelength transition may happen at the pump wavelength and control the Q-factor of the pump cavity mode. The sharpness of the wavelength transition is defined as the spectral width of the transition between high Q-factor modes and low Q-factor modes, and can be expressed as the derivative of the mirror transmission versus wavelength $S=dT/d\lambda$. The spectral width can be expressed either in frequency, wavelength, or a percentage. The spectral width, or sharpness, should be about twice the idler frequency or smaller. In an embodiment in which the sharpness is not exactly twice or smaller than the idler frequency, a slightly reduced efficiency can be expected. In certain embodiments, the sharpness may be one times the idler frequency. In some embodiments, the sharpness may be smaller than $\frac{1}{3}$ the idler frequency. In some embodiments, the sharpness may be smaller than $\frac{1}{2}$ the idler frequency. In certain embodiments, the sharpness may be smaller than 3 times the idler frequency. In some embodiments, the sharpness may be smaller than 5 times the idler frequency. In some embodiments, the sharpness may be smaller than 10 times the idler frequency.

The wavelength dependence should lead to low Q-factors for modes on the blue-shifted (shorter wavelength) of the pump wavelength. A large asymmetry between red and blue modes Q-factors may give the best efficiency. Thus, in some embodiments, 1, or 2 or more blue shifted modes (referred to as $Q_b$) have a low Q factor. The low Q-factor can have absolute values on the order of 10, 100, or 1,000 or can be smaller than the red-shifted modes Q-factors ($Q_r$) by a factor of 10, 100, 1,000, or 10,000 or more. In certain embodiments, a large difference between Q-factors of the red-shifted modes (referred to as $Q_r$ or $Q_n$) and the pump mode (referred to as $Q_0$ provides a more efficient cascading process.

In certain embodiments, either a cavity mirror, or an intra-cavity filter can provide the wavelength dependence.

This may be realized by having an in-coupling mirror with frequency dependence, or an intra-cavity spectral filter. The intra-cavity filter can be either absorptive (referred to as filter) or reflective (referred to as intra-cavity mirror). This can be achieved with, for example, an edge filter, or notch filter for the former, or a dichroic mirror for the latter. In certain embodiments, such as shown in FIG. 2I, the tuning of the transition wavelength can be achieved by, for example, controlling the angle, or temperature, or mechanical (e.g., piezo effect), or electro-optic (e.g., Pockels effect) properties, of the mirror or filter, or combination thereof.

In certain embodiments, such as is shown in FIG. 3A, a sharp frequency-dependent transmission may be realized by coupling the cavity to a secondary resonator with a different free-spectral range. Wavelength dependent transmission in the first resonator is achieved by aligning and tuning a secondary cavity mode around the primary cavity's pump mode, or first or higher blue shifted mode. The aligned mode's energy will leak out through the secondary resonator, achieving wavelength dependent transmission for the primary resonator.

In some embodiments, a frequency dependent system can be achieved with non-reciprocal coupling of multi-resonators. In this embodiment, blue-shifted modes are forbidden through the non-reciprocity between resonators.

The nonlinearity described above should provide three-wave mixing and thus should generally be of second-order and may be provided by conventional non-centrosymmetric nonlinear media with strong nonlinearities. Possible materials include common inorganic crystals such as $LiNbO_3$, $LiTaO_3$, $LiIO_3$, $KNbO_3$, $BaTiO_3$, KDP, KTP, BBO, LBO, GaAs, GaP, GaSb, GaSe, ZnSe, ZnTe, CdTe, CdS, CdSe, $AgGaSe_2$, $AgSbS_3$, InP, Zno, ZGP, CSP, InAs, InSb, Te, $CdGaAs_2$, $CdGeP_2$, or organic crystals such as DAST, OH1, DSTMS, BNA, LAPC, or ferromagnetic/nonmagnetic alloys such as Fe/Au, Fe/Pt, YIG/Pt, $YIG/Cu_{1-x}Ir_x$, or ferromagnetic alloys such as $Ni_{89}Fe_{19}$, $Co_{70}Fe_{30}$, CoFeB alloys, or ferroelectric materials such as $KNO_3$, $KTa_xNb_{1-x}$ $O_3$, $BaxSr_{1-x}TiO_3$, $SrBaNbO_3$, $K_3Li_2Nb_5O_{15}$, $K_xNa_{1-x}$ $SryBa_{1-y}$—$Nb_2O_6$, $KH_2PO_4$, $KH_2AsO_4$, $NH_4H_2PO_4$, $ND_4D_2PO_4$, $RbH_2ASO_4$, $KTiOPO_4$, $KTiOAsO_4$, $RbTiOPO_4$, $RbTiOAsO_4$, $CsTiOASO_4$, $Pb(ZrxTi_{1-x})O_3$, La-doped $Pb(Zr_x$, $Ti_{1-x})O_3$, (1–x) $[Pb(Mg_{1/3}Nb_{2/3}O_3)$–x[Pb-$TiO_3]$, $(1-x)[Pb(Zr_{1/3}Nb_{2/3}O_3)$–x[PbTiO_3), ($0<x<1$; $0<y<1$), but is not limited thereto. Artificially induced second-order media such as metamaterials can also be used.

In some embodiments, a third-order nonlinear medium can be used to achieve an effective second-order response by, for example, applying a continuous-current (DC) electric field. Possible materials include silicon or germanium but are not limited thereto.

In some embodiments, multiple nonlinear effects such as second-order, third-order, and others, can exist simultaneously. Non second-order nonlinear effects can be weakened by increasing the beam radius of the pump, and other modes, in the nonlinear medium, reducing the infrared intensity in the nonlinear medium at constant pump power, and with it unwanted nonlinear effects. In certain embodiments, a third order nonlinearity can be exploited as another degree of freedom The nonlinear medium 12 can possess birefringence or be periodically polled allowing for various phase matching techniques. There is no a priori restriction on the length of the nonlinear medium. Therefore, the nonlinear medium length can vary from 100 nm (preferred for integrated embodiments) to a centimeter scale (preferred for free-space embodiments). Further, there is no restriction on the form of the nonlinear medium. Therefore, the nonlinear medium can come in any shape or combination of shapes. This includes patterning of the nonlinear medium, as well as combining different nonlinear mediums. The nonlinear medium can have an anti-reflective coating for the pump, cascading modes, and idler, or for individual wavelengths. The non-linear medium can also be at the Brewster angle to reduce Fresnel reflections, or to compensate for astigmatism in bow-tie cavities using concave mirrors.

In certain embodiments, a broadband cavity is utilized which allows for a plurality of nonlinear cascading orders. For example, there may be 5, 10, 20, 50, 100, 200 or more cascading orders. In embodiments with more than 5, 10, 50, 100, or 200 cascading orders, a quantum efficiency larger than 500%, 1,000%, 5,000%, 10,000% and 20,000% can be achieved, respectively.

The frequency of the nonlinear cascading orders should preferably be equally spaced by the idler (terahertz) fre-quency. Dispersion from nonlinear medium, mirrors and other optical elements in the cavity can detune the cavity resonant modes frequencies. There are various techniques that may be used to mitigate this dispersion. These tech-niques include:

Using a large cavity length to nonlinear crystal ratio to minimize dispersion effect. Possible cavity to nonlinear medium lengths ratios are on the order of 1,000, 100, 10, 1, but not limited thereto;

Dispersion compensation with a double pair of prisms, or diffractive gratings;

Use of a cavity with low Q-factors which increases the mode bandwidth, and consequently, reduces the dis-persion impact; and Dispersion engineering in micro resonator by geometrical or mode engineering.

The frequency detuning induced by dispersion over the pump mode, or the N mode, or both modes, is defined as $\Delta\omega_n$, while the decay rate is defined as $\gamma_0$. In certain embodiments, the ratio of the frequency detuning to the decay rate is less, equal, or approximately 1

$$\left(\frac{\Delta\omega_n}{\gamma_0} \le 1\right).$$

As described above, a pump source is used to excite the cavity and initiate the nonlinear process. The pump source can be continuous-wave or pulsed. The pump source can have pulse widths varying from milliseconds, microseconds, nanoseconds, picoseconds to femtoseconds. Narrow pump pulse widths (e.g. nanoseconds, picoseconds, femtoseconds) may be widened and shaped by temporal or spectral pulse shaping techniques. In one embodiment, pulse broadening and shaping (flat-top) is accomplished by the coherent stacking of 2 or more replicas of the input pump pulse. In another embodiment, Fourier-transform limited pulses can be broadened by narrow passband filtering.

The single-frequency operation of the light source can be further enhanced by using a pump with a narrow linewidth such as a stabilized external cavity laser or injection seeded nanosecond pulsed laser.

In some embodiments, a second pump, also referred to as the signal or seed, can be used to control the idler (terahertz) frequency. The idler frequency is defined by the spectral difference between the main and secondary sources. The spectral difference should be larger than the pump linewidth and up to 30 THz and more. Continuous tuning of the idler frequency may be achieved by mechanical (piezo) or ther-mal tuning of the cavity to adjust the free spectral range. The seed can also be continuous-wave or pulsed. The power of the second pump (seed) can range from below 1 mW to more than 100 W.

In some embodiments, the idler (terahertz) frequency is defined by the phase matching condition of the nonlinear medium at the pump frequency.

In some embodiments, the light source can be realized using multiple coupled resonators. The individual cavities may be weakly coupled. The individual resonators may be, for example, a photonic crystal resonance mode, or Mie-resonant dielectric structures, or other localized optical modes. Other types of resonators mentioned in the above embodiment can also work. In one embodiment, the reso-nant structures would be commensurate with the pump wavelength, such as between 500 nm and 10 microns. Sharp frequency-dependent transmission may be realized by con-trolling the individual resonators frequencies and Q-factors.

In certain embodiments, broadband operation is provided by the number of individual cavities. Dispersion can be compensated by the individual cavity design.

In one embodiment, the light source can be realized in a chain of coupled resonators along a synthetic frequency dimension, as shown in FIG. 9A. Resonators indexed 0 to N−1 are coupled along with the synthetic dimension corre-sponding to the mode frequency $\omega$. The nearest-neighbor resonators are coupled through an effective nonlinear coef-ficient $\kappa=-i\omega_n\beta_n\alpha_T \ll Q_r$.

In this embodiment, the pump and Q-factor distributions are chosen to favor the excitation of a forward propagating mode along with the mode index direction N (towards decreasing values in synthetic frequency space $\omega$). Impor-tantly, the mode N at the end of the chain is chosen to minimize reflection at the boundary of the synthetic dimen-sion with $\gamma_N \sim \omega$ (since a backward propagating wave would result in THz annihilation).

In another embodiment, the embodiment of FIG. 9A is repeated along another synthetic or real dimension in M copies, resulting in a two-dimensional array of coupled resonators, as shown in FIG. 9B. In this embodiment, the coupling between nearest-neighbor along each synthetic or real dimension is chosen in order to create propagating modes with non-trivial topological properties. One specific realization of this embodiment can be realized with M=2, resulting in a ladder-like system where mode propagation along a single edge of the ladder is also possible. More generally, the coupling between the resonators is designed to allow the existence of chiral edge states, which can only propagate along a given direction along the edge of the array (i.e., the synthetic frequency dimension).

Having defined various possible embodiments, several actual configurations are described next.

In one embodiment, a broadband ring resonator is formed by four mirrors, two 90° off-axis parabolic mirrors and two flat mirrors. This may be similar to the configuration shown in FIG. 2F. The mirrors should be reflective over a broad spectral range including the terahertz frequency of interest. A dielectric mirror is placed in the ring cavity to control the mode lifetime. The embodiment comprises a free-space ring-cavity with cavity length of 0.6 meter for the IR wavelength and the THz frequency, and a 10 μm LiNbO$_3$ crystal as the nonlinear medium. The cavity modes Q-factors are $Q_n=10^7$, $Q_b=30$, $Q_0=Q_N=5\cdot10^3$, $Q_T=10^4$. The experimen-tal embodiment with N=24 red-shifted modes is considered, corresponding to an optical bandwidth of 166 nm for pump wavelength $\lambda_0=1.55$ μm and THz frequency $\omega_T=2\pi\cdot1$ THz.

FIG. 5B shows the time evolution of the photon efficiency. A photon efficiency of $\eta_{QE}$=2,160% at a continuous pump power $P_0$=100 W is estimated, corresponding to an energy conversion efficiency of $\eta_e$=11.2%. This is more than 20 times the MR limit.

In another embodiment, the system comprises a free-space optical cavity length of 2 meters for the IR wavelength, a cavity length of 0.5 meter for the THz frequency, and a OH1 crystal having a length of 500 µm as the nonlinear medium. This configuration may be similar to that shown in FIG. 2M. The nonlinear coupling rate is $3.5 \cdot 10^{-5}/\sqrt{J}$. The pump wavelength is 1.4 µm and the wavelength of the THz frequency is 300 µm. The steady-state photon efficiency of each mode is shown in FIG. 6C. It can be seen how the efficiency distribution across the cascading modes is almost constant, indicating minimal reflection in the system. The cavity modes Q-factors are depicted in FIG. 6D. These values are $Q_n$=8·10$^7$, $Q_0$=$Q_N$=2.25·10$^6$, and $Q_T$=4·10$^4$. Assume N=40 red-shifted modes, a CW pump wavelength $\lambda_0$=1.4 µm and THz frequency $\omega_T$=2π·1 THz. FIGS. 6A-6B show the time evolution of the cavity mode energies and photon efficiencies, respectively. A photon efficiency of $\eta_{QE}$=1,600% at a peak pump power $P_0$=100 kW is estimated, as shown in FIG. 6E. This corresponds to an energy conversion efficiency of about $\eta_e$≈7.4%. The smaller quantum efficiency reflects the lower red-shifted to pump mode Q factors asymmetry. Nevertheless, a large net THz gain is still achieved. FIG. 6F shows the terahertz output power as a function of pump power.

In another embodiment, the ring cavity has identical free-space optical cavity length of 0.15 meter for the IR and THz modes, and a OH1 crystal having a length of 600 µm is used as the nonlinear medium. The cavity modes Q-factors are depicted in FIG. 7A with $Q_n$=6·10$^6$, $Q_0$=$Q_N$=3.5·10$^5$, $Q_b$=3·10$^4$ and $Q_T$=1.5·10$^3$. ±20 cavity modes are considered, with a 10 ns pulse pump at a wavelength $\lambda_0$=1.064 µm and THz frequency $\omega_T$=2π·1 THz. A second low-frequency CW pump ($\omega_1$=$\omega_0$–$\omega_T$) is injected. FIG. 7B displays the nonlinear coupling coefficient, β, for the different modes. FIG. 7C shows the temporal shape of the pump for different peak power up to 10 MW. FIG. 7D shows the time evolution of the cavity mode energies. In FIG. 7E, the generated instantaneous THz power is shown. FIG. 7F shows the photon efficiency as a function of the pump peak power, with a quantum efficiency of up to $\eta_{QE}$=600%. This corresponds to an energy conversion efficiency about $\eta_e$≈2.1%.

In another embodiment, a cavity with the same parameters as the previous embodiment is utilized. However, in this embodiment, pulse shaping is used to obtain about three times longer pump pulses from the 10 ns initial pump. ±20 cavity modes are considered with a 3·10 ns pulse pump at a wavelength $\lambda_0$=1.064 µm and THz frequency $\omega_T$=2π·1 THz. The cavity modes Q-factors are depicted in FIG. 8A, with $Q_n$=6·10$^6$, $Q_0$=$Q_N$=1.25·10$^5$, $Q_b$=3·10$^4$, $Q_T$=1.25·10$^3$. FIG. 8B displays the nonlinear coupling coefficient, β, for the different modes. FIG. 8C shows the temporal shape of the pump for different peak power up to 10 MW. FIG. 8D shows the time evolution of the cavity mode energies. In FIG. 8E, the generated instantaneous THz power is shown. FIG. 8F shows the photon efficiency as a function of the pump peak power. An increased quantum efficiency of up to $\eta_{QE}$=950%, which corresponds to an energy conversion efficient of around 3.3%, is obtained due to the pulse shaping of the pump.

Figure 13:
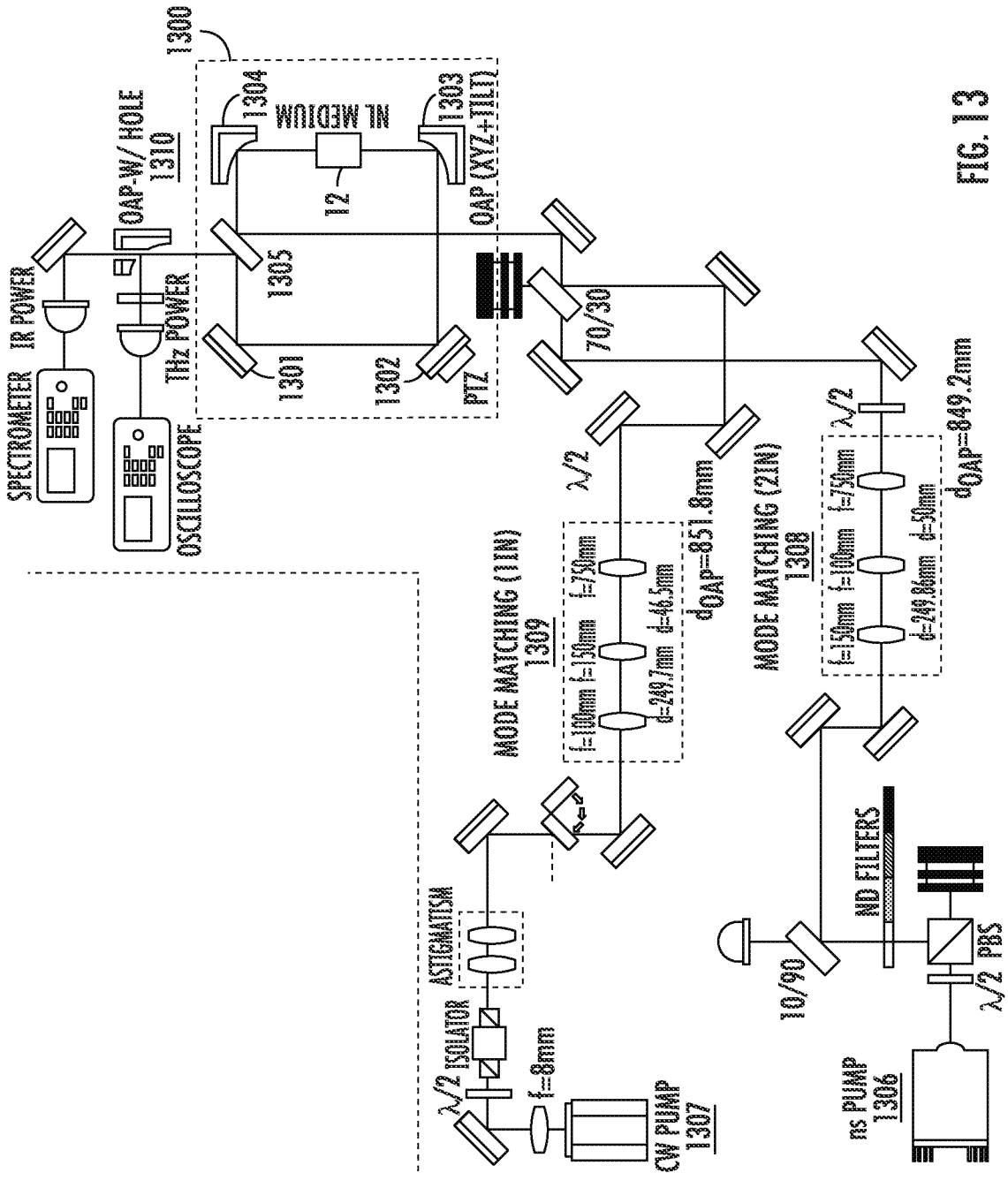
FIG. 13 shows another embodiment of a nonlinear light source producing high power terahertz waves.

In one embodiment shown in FIG. 13, a broadband ring resonator 1300 is formed by four mirrors, two 90° off-axis parabolic mirrors 1303, 1304 and two flat mirrors 1301,

1302. The mirrors should be reflective over a broad spectral range including the terahertz frequency of interest. A wavelength-dependent dielectric mirror 1305 is placed in the ring cavity to control the modes lifetime. The embodiment comprises a free-space ring-cavity with cavity length of 0.25 meter for the IR wavelength and the THz frequency, and a 600 µm OH1 crystal as the nonlinear medium 12. The cavity modes Q-factors are $Q$≈8·10$^6$, $Q_b$≈10$^3$, $Q_0$=$Q_N$=2·10$^6$, $Q_T$≈5·10$^3$.

The experimental embodiment with N=7 red-shifted modes is considered, corresponding to an optical bandwidth of 28 nm for pump wavelength $\lambda_0$=1.064 µm and THz frequency $\omega_T$=2π·1 THz. The pump source comprises a high-power nanosecond pulsed laser 1306 at a center wavelength of $\lambda_0$=1.064 µm and a Fourier transform limited pulse with a width of 30 ns. A second low-frequency tunable continuous-wave pump 1307 (signal), with frequency $\lambda_1$=1.068 µm, and linewidth below 10 MHz is used to control the terahertz frequency. Optical lenses 1308, 1309 are used to match the beam profile to the cavity eigenmode, i.e. mode matching. The two pumps are combined before coupling to the cavity. At the output of the cavity, an off-axis parabolic mirror 1310 with a through hole is used to separately analyze the infrared and terahertz signals.

A photon efficiency of $\eta_{QE}$≈140%, at a pump peak power $P_0$=1 MW is estimated, more than 1.4 times the MR limit.

Figure 14:
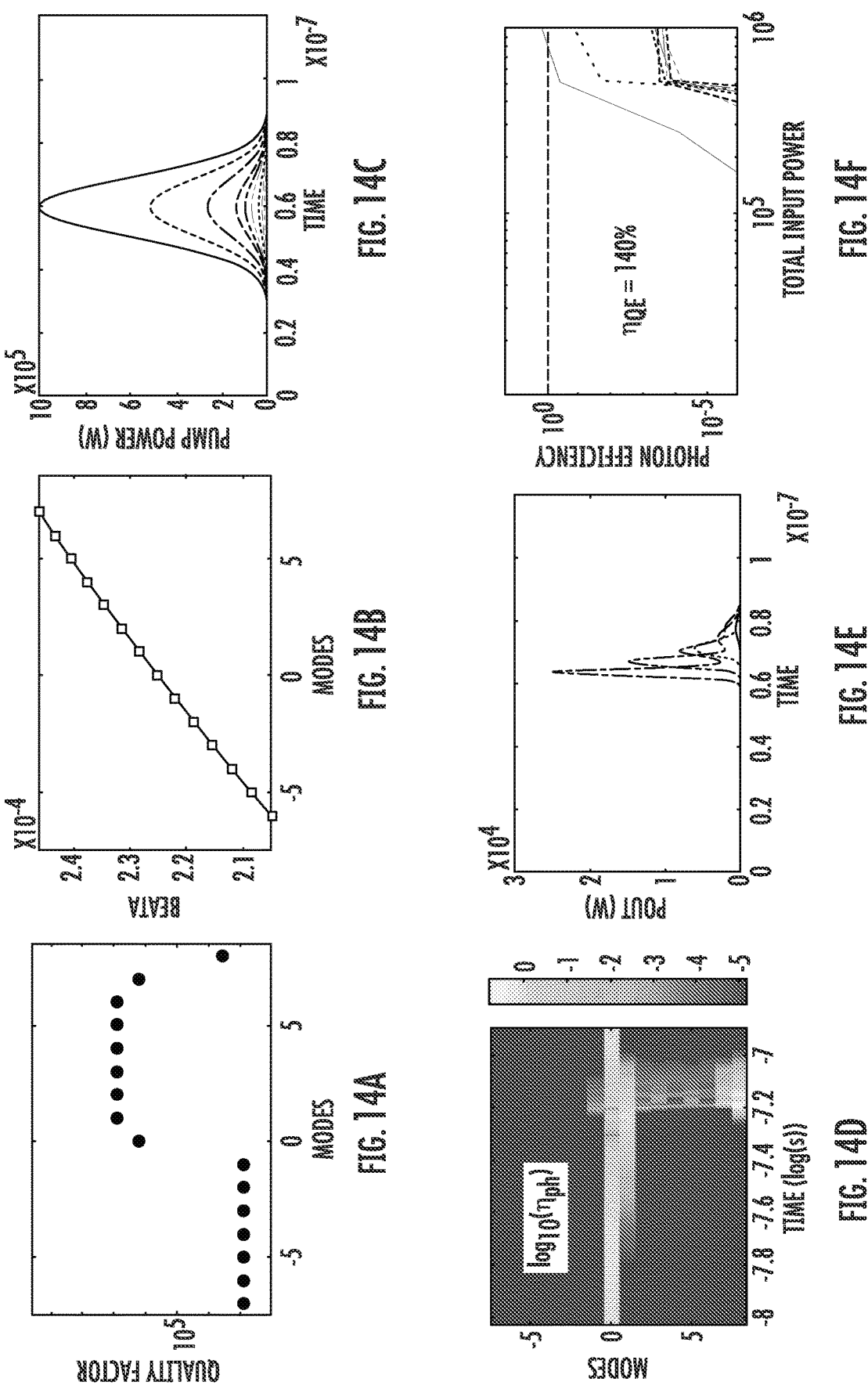
FIGS. 14A-14F show the simulation results associated with the embodiment shown in FIG. 13.

The cavity modes Q-factors are depicted in FIG. 14A with $Q_n$≈8·10$^6$, $Q_b$≈10$^3$, $Q_0$=$Q_N$=2·10$^6$, $Q_T$≈5·10$^3$. FIG. 14B displays the nonlinear coupling coefficient, β, for the different modes. FIG. 14C shows the temporal shape of the pump for different peak power up to 1 MW. FIG. 14D shows the time evolution of the cavity mode photon efficiencies. In FIG. 14E, the generated instantaneous THz power is shown. FIG. 14F shows the photon efficiency as a function of the pump peak power, with a quantum efficiency of up to $\eta_{QE}$=140%, which corresponds to an energy conversion efficient of around 0.50%.

Figure 15:
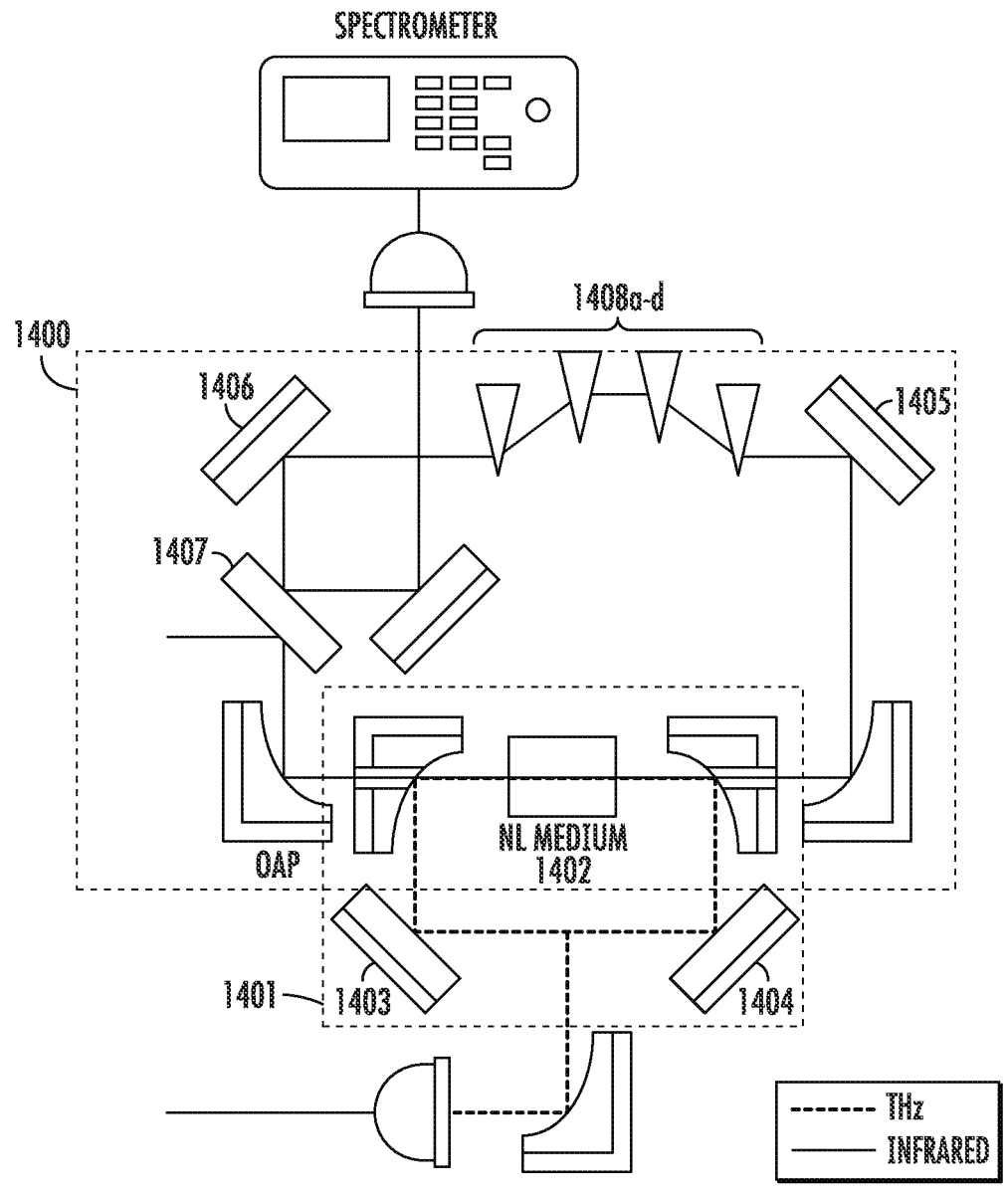
FIG. 15 shows a cavity that is decoupled for different frequencies which can be used in the system of FIG. 13.

In another embodiment, shown in FIG. 15, the ring cavity of the system described in FIG. 13, is decoupled for the infrared (solid lines) and terahertz (dashed lines) frequencies, forming two independent ring cavities. The two cavities 1400, 1401 have a collinear propagation through the nonlinear crystal 1402. The flat mirrors 1403, 1404, 1405, 1406 should be reflective over the respective spectral range (infrared or terahertz frequency). A dielectric mirror 1407 with a sharp wavelength-dependent transmission is placed in the ring cavity to control the mode lifetime. The embodiment comprises a free-space ring-cavity with cavity length of 0.5 meter for the IR wavelength and 0.25 meter for the THz frequency, and a 600 µm OH1 crystal as the nonlinear medium. The cavity modes Q-factors are $Q_n$≈1.5·10$^7$, $Q_b$=1000, $Q_0$=$Q_N$≈2·10$^6$, $Q_T$≈2.5·10$^3$. In this embodiment, 4 prisms 1408$a$-$d$ are introduced in the infrared cavity to compensate the dispersion introduced by the nonlinear crystal 1402 and wavelength-dependent mirror. This allows a larger number of modes to be resonant inside the cavity. The experimental embodiment with N=20 red-shifted modes is considered, corresponding to an optical bandwidth of 80 nm for pump wavelength $\lambda_0$=1.064 µm and THz frequency $\omega_T$=2π·1 THz. The pump source, similar to that shown in FIG. 13, comprises a high-power nanosecond pulsed laser at a center wavelength of $\lambda_0$=1.064 µm and a pulse with a width of 50 ns. A second low-frequency tunable continuous-wave pump (signal), with frequency $\lambda_1$=1.068 µm, and linewidth below 10 MHz is used to control the terahertz frequency. Optical lenses are used to match the beam profile to the cavity eigenmode, i.e. mode matching. The two pumps are combined before coupling to the cavity.

The cavity modes Q-factors are depicted in FIG. 16A with $Q_n \approx 1.5 \cdot 10^7$, $Q_b \approx 1000$, $Q_0 = Q_N \approx 2 \cdot 10^6$, $Q_T \approx 2.5 \cdot 10^3$. FIG. 16B displays the nonlinear coupling coefficient, $\beta$, for the different modes. FIG. 16C shows the temporal shape of the pump for different peak power up to 1 MW. FIG. 16D shows the time evolution of the cavity mode photon efficiencies. In FIG. 16E, the generated instantaneous THz power is shown. FIG. 16F shows the photon efficiency as a function of the pump peak power, with a quantum efficiency of up to $\eta_{QE} = 500\%$. which corresponds to an energy conversion efficient of around 1.8%.

This system and method have many advantages. Efficient, high-power, tunable single-frequency terahertz sources are of high interest for a wide range of applications, including security scanners, radar imaging, astronomy, spectroscopy and telecommunications, as well as for scientific research to probe new phase transitions in quantum materials or electron beam acceleration for X-ray sources. While high-power terahertz sources are available in large facilities, the opportunities to have a widely available and compact, high-power and efficient terahertz source will create numerous new opportunities for the above-mentioned applications.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system to generate waves having a terahertz frequency, comprising:

a pump having a pump frequency, wherein the pump frequency comprises a visible wavelength, a near-infrared wavelength, an infrared wavelength or a mid-infrared wavelength;

a multimodal cavity defined by two or more mirrors, wherein the modes are separated by the terahertz frequency of interest or a fraction of it, and wherein at least one of the two or more mirrors comprises a frequency dependent mirror having a frequency dependent transmissivity or reflectivity profile; and a nonlinear medium disposed within the cavity, wherein the frequency dependent mirror defines a portion of the cavity and is configured such that reflectivity of modes having a frequency less than the pump frequency comprise a first value, and the reflectivity of at least one mode having a frequency greater than the pump frequency comprises a second value, less than the first value.

2. The system of claim 1, wherein the multimodal cavity comprises at least 10 modes.

3. The system of claim 1, wherein the nonlinear medium comprises one or more of $LiNbO_3$, $LiTaO_3$, $LiIO_3$, $KNbO_3$, $BaTiO_3$, KDP, KTP, BBO, LBO, GaAs, GaP, GaSb, GaSe, ZnSe, ZnTe, CdTe, Cds, CdSe, $AgGaSe_2$, $AgSbS_3$, InP, Zno, ZGP, CSP, InAs, InSb, Te, $CdGaAs_2$, $CdGeP_2$, DAST, OH1, DSTMS, BNA, LAPC, Fe/Au, Fe/Pt, YIG/Pt, $YIG/Cu_{1-x}Ir_x$, $Ni_{89}Fe_{19}$, $CO_{70}Fe_{30}$, CoFeB alloys, $KNO_3$, $KTa_xNb_{1-x}O_3$, $BaxSr_{1-x}TiO_3$, $SrBaNbO_3$, $K_3Li_2Nb_5O_{15}$, $K_x$ $Na_{1-x}Sr_y$ $Ba_{1-y}$-$Nb_2O_6$, $KH_2PO_4$, $KH_2AsO_4$, $NH_4H_2PO_4$, $ND_4D_2PO_4$, $RbH_2AsO_4$, $KTiOPO_4$, $KTiOAsO_4$, $RbTiOPO_4$, $RbTiOAsO_4$, $CsTIOAsO_4$, Pb $(ZrxTi_{1-x})O_3$, La-doped $Pb(Zr_x, Ti_{1-x})O_3$, $(1-x)[Pb(Mg_{1/3}Nb_{2/3}O_3)-x[Pb-TiO_3]$, and $(1-x)[Pb$ $(Zr_{1/3}Nb_{2/3}O_3)-x[PbTiO_3)$, $(0<x<1; 0<y<1)$.

4. The system of claim 1, wherein the first value is greater than the second value by at least a factor of 2.

5. The system of claim 1, wherein the cavity supports at least 5 cascading orders.

6. The system of claim 1, wherein a quantum efficiency of the system is greater than 500%.

7. The system of claim 1, wherein at least one of the two or more mirrors comprises a metallic mirror, a Plano (flat) mirror, or a focusing concave or parabolic mirror with off-axis angles varying from 0° to 90°.

8. The system of claim 1, wherein the cavity is arranged as a ring configuration.

9. The system of claim 1, wherein the cavity is arranged as a semi-confocal or confocal configuration.

10. The system of claim 1, wherein the cavity is arranged as a bow-tie configuration.

11. The system of claim 1, wherein the pump comprises a second mode, defined as a seed or low-frequency pump, and wherein the pump frequency and the seed are separated by the terahertz frequency.

12. A system to generate waves having a terahertz frequency, comprising:

a pump having a pump frequency, wherein the pump frequency comprises a visible wavelength, a near-infrared wavelength, an infrared wavelength or a mid-infrared wavelength;

a multimodal cavity defined by two or more mirrors, wherein the modes are separated by the terahertz frequency of interest or a fraction of it, and wherein at least one of the two or more mirrors comprises a frequency dependent mirror having a frequency dependent transmissivity or reflectivity profile; and a nonlinear medium disposed within the cavity, wherein the frequency dependent mirror is disposed within the cavity and is configured such that transmissivity of modes having a frequency less than the pump frequency comprise a first value, and the transmissivity of at least one mode having a frequency greater than the pump frequency comprises a second value, less than the first value.

13. The system of claim 12, wherein the first value is greater than the second value by at least a factor of 2.

14. The system of claim 12, wherein the multimodal cavity comprises at least 10 modes.

15. The system of claim 12, wherein the cavity supports at least 5 cascading orders.

16. The system of claim 12, wherein a quantum efficiency of the system is greater than 500%.

17. The system of claim 12, wherein at least one of the two or more mirrors comprises a metallic mirror, a Plano (flat) mirror, or a focusing concave or parabolic mirror with off-axis angles varying from 0° to 90°.

18. The system of claim 12, wherein the pump comprises a second mode, defined as a seed or low-frequency pump, and wherein the pump frequency and the seed are separated by the terahertz frequency.

19. A system to generate waves having a terahertz frequency, comprising:

a pump having at least one mode, wherein at least one mode is defined as a pump frequency, wherein the pump frequency comprises a visible wavelength, a near-infrared wavelength, an infrared wavelength or a mid-infrared wavelength; and a non-linear resonator, wherein the quantum efficiency of the system is greater than 500%, wherein a sharp wavelength transition occurs at the pump frequency, and wherein a sharpness, defined as a derivative of a mirror transmission or absorption versus wavelength, is smaller than twice the terahertz frequency.

20. The system of claim 19, wherein the pump further comprises at least a second mode and wherein the second mode is defined as seed or low-frequency pump, and wherein the first mode and the second mode are separated by the terahertz frequency.

21. The system of claim 19, wherein a quantum efficiency of the system is greater than 1,000%.

22. The system of claim 19, a Q-factor of at least one frequency less than the pump frequency is greater than a Q-factor of at least one frequency greater than the pump frequency by at least a factor of 2.

23. The system of claim 19, wherein the non-linear resonator comprises a micro-ring resonator coupled to a second micro-ring resonator.

24. The system of claim 23, wherein at least one micro-ring resonator is made from a nonlinear material.

25. The system of claim 23, wherein the micro-ring resonator is coupled to an antenna.

26. The system of claim 19, wherein the non-linear resonator comprises a photonic crystal fiber.

27. The system of claim 26, wherein the photonic crystal fiber is made from a nonlinear material.

28. The system of claim 26, wherein the photonic crystal fiber is filled with a nonlinear material.

29. The system of claim 19, wherein the non-linear resonator comprises a plurality of cavity resonators.

30. The system of claim 19, wherein the nonlinear medium forms the non-linear resonator.

31. The system of claim 19, wherein the nonlinear resonator comprises a photonic crystal cavity.

32. The system of claim 19, wherein the nonlinear resonator comprises a bound state in the continuum.

33. The system of claim 19, wherein the sharpness is smaller than the terahertz frequency.

34. The system of claim 19, wherein the non-linear resonator comprises a plurality of modes, and wherein at least one mode having a frequency greater than the pump frequency has a Q-factor that is less than a Q-factor of a frequency less than the pump frequency.

35. The system of claim 34, wherein the Q-factor of the pump mode is less than the Q-factor of other modes having a frequency less than the pump frequency.

36. The system of claim 34, wherein a Q-factor of the mode with the lowest frequency is less than the Q-factor of other modes having a frequency less than the pump frequency.

37. The system of claim 35, wherein the Q-factor of the pump is at least 2 times smaller than the Q-factor of the other modes having a frequency less than the pump frequency.

38. The system of claim 36, wherein the Q-factor of the mode with the lowest frequency is at least 2 times smaller than the Q-factor of the other modes having a frequency less than the pump frequency.

* * * * *